(12) United States Patent
Alberda et al.

(10) Patent No.: US 12,734,877 B2
(45) Date of Patent: Sep. 15, 2026

(54) ELECTRIC VEHICLE RADIATOR ASSEMBLY

(71) Applicant: Hyroad Networks LLC, Austin, TX (US)

(72) Inventors: Wouter Alberda, Berlin (DE); Jörg Herrmann, Berlin (DE); Swen Hagenmüller, Berlin (DE); Richard Todd Sondles, Maricopa, AZ (US)

(73) Assignee: HYROAD NETWORKS LLC, Austin, TX (US)

(*) Notice: Subject to any disclaimer, the term of this patent is extended or adjusted under 35 U.S.C. 154(b) by 314 days.

(21) Appl. No.: 18/466,169

(22) Filed: Sep. 13, 2023

(65) Prior Publication Data

US 2024/0092161 A1 Mar. 21, 2024

Related U.S. Application Data

(60) Provisional application No. 63/507,136, filed on Jun. 9, 2023, provisional application No. 63/376,032, filed on Sep. 16, 2022.

(51) Int. Cl.
*B60K 11/04* (2006.01)

(52) U.S. Cl.
CPC .................................... *B60K 11/04* (2013.01)

(58) Field of Classification Search
CPC ...................................................... B60K 11/04
USPC ........................................................ 180/68.4
See application file for complete search history.

(56) References Cited

U.S. PATENT DOCUMENTS 4,921,062 A 5/1990 Marlowe
6,318,450 B1 * 11/2001 Acre .................... F28D 1/0435 165/149
7,255,189 B2 * 8/2007 Kurtz, Jr. .............. B60K 11/04 123/41.43
7,370,690 B2 * 5/2008 Rasset .................. F28D 1/0435 165/41
7,398,847 B2 * 7/2008 Schmitt ................. B60K 11/04 248/232
7,753,152 B2 * 7/2010 Nakae ..................... F01P 11/10 165/41
8,186,751 B2 * 5/2012 Davisdon ............... B60R 19/52 296/193.1

(Continued)

OTHER PUBLICATIONS

International Bureau; International Search Report and Written Opinion dated Dec. 12, 2023.

*Primary Examiner* — Hau V Phan
(74) *Attorney, Agent, or Firm* — SNELL & WILMER L.L.P.

(57) ABSTRACT

The present disclosure provides a radiator assembly that includes a stationary assembly that includes a fan assembly coupled to a fan frame assembly, a rotating assembly that includes a radiator frame assembly and a support frame assembly coupled to the radiator frame assembly, and an actuation assembly coupled to the rotating assembly. The rotating assembly may be rotatably coupled to the stationary assembly and configured to rotate relative to the stationary assembly in a first direction and a second direction opposite the first direction. The actuation assembly may be configured to enable and limit rotation of the rotating assembly relative to the stationary assembly in the first direction and the second direction.

20 Claims, 11 Drawing Sheets

(56) References Cited

U.S. PATENT DOCUMENTS

| | | | | |
|---|---|---|---|---|
| 8,312,951 | B2 * | 11/2012 | Bui | B60K 11/04 165/67 |
| 8,528,677 | B2 * | 9/2013 | Davis | F01P 11/12 165/104.19 |
| 10,294,850 | B2 * | 5/2019 | Shue | E21B 7/046 |
| 10,584,465 | B2 * | 3/2020 | Sakon | B60K 11/02 |
| 10,823,039 | B2 * | 11/2020 | Van Hal | F01P 3/18 |
| 11,598,244 | B2 * | 3/2023 | Ghorpade | E02F 9/0866 |
| 11,772,481 | B2 * | 10/2023 | Glickman | B62D 65/10 180/68.1 |
| 2002/0053480 | A1 * | 5/2002 | Pack | B60K 11/04 180/374 |
| 2005/0279548 | A1 | 12/2005 | Kurtz et al. | |
| 2009/0078394 | A1 * | 3/2009 | Weatherup | B60K 11/04 165/47 |
| 2013/0074410 | A1 * | 3/2013 | Berkeland | E02F 9/0866 49/142 |
| 2020/0291846 | A1 | 9/2020 | Steffens et al. | |

* cited by examiner

ELECTRIC VEHICLE RADIATOR ASSEMBLY

CROSS-REFERENCE TO RELATED APPLICATIONS

This application claims priority to, and the benefit of: (i) U.S. Provisional Patent Application Ser. No. 63/376,032 entitled "ELECTRIC VEHICLE RADIATOR ASSEMBLY" filed on Sep. 16, 2022; and (ii) U.S. Provisional Patent Application Ser. No. 63/507,136 entitled "ELECTRIC VEHICLE RADIATOR ASSEMBLY" filed on Jun. 9, 2023. Each of the foregoing applications is hereby incorporated by reference in its entirety for all purposes, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to commercial vehicles, and more particularly, to commercial vehicles having variable service configurations.

BACKGROUND

Commercial vehicles, particularly heavy-duty commercial vehicles, pose a unique issue for those tasked with servicing and maintaining the vehicles. For example, due to packaging constraints, many of the components requiring service or maintenance, including various powertrain and thermal management components, are positioned beneath the vehicle cab and above the chassis, which makes accessing these components difficult. Traditionally, manufacturers have attempted to solve this issue by enabling the vehicle cab to rotate away from the chassis in order to expose the components between the cab and chassis. However, this solution may be ineffective for designs that have large components near the front of the cab that would physically interfere with the cab during rotation. This is particularly true in the case of commercial battery electric vehicles (BEVs) and fuel cell electric vehicles (FCEVs), which are spatially constrained due to the number of parts required, the need for multiple thermal management systems, and the size of certain thermal management components. As a result, alternative designs enabling access to components positioned between the vehicle chassis and cab remain desirable.

SUMMARY

A radiator assembly may comprise a stationary assembly comprising a fan assembly coupled to a fan frame assembly, a rotating assembly comprising a radiator frame assembly and a support frame assembly coupled to the radiator frame assembly, and an actuation assembly coupled the rotating assembly. The rotating assembly may be rotatably coupled to the stationary assembly and configured to rotate relative to the stationary assembly in a first direction and a second direction opposite the first direction. The actuation assembly may be configured to enable and limit rotation of the rotating assembly relative to the stationary assembly in the first direction and the second direction.

In various embodiments, the fan frame assembly comprises a frame plate, a frame bracket, a first attachment bracket, and a second attachment bracket. The stationary assembly may further comprise a latch mount coupled to the frame bracket. The rotating assembly may further comprise a striker coupled to a striker mount coupled to the support frame assembly. The actuation assembly may further comprise a latch coupled to the latch mount and configured to interface with the striker. The actuation assembly may comprise a pull cable coupled to and configured to open the latch. The actuation assembly may comprise a strap assembly and an actuation handle. The strap assembly may comprise a first strap anchor assembly coupled to the rotating assembly and a second strap anchor assembly configured to be coupled to a vehicle cab. The strap assembly may further comprise a strap rotatably coupled to the first strap anchor assembly and rotatably coupled to the second strap anchor assembly.

A radiator assembly for an electric vehicle may comprise a stationary assembly, a rotating assembly rotatably coupled to the stationary assembly and configured to rotate in a first direction and a second direction opposite the first direction relative to the stationary assembly, and an actuation assembly coupled to the rotating assembly and configured to enable and limit rotation of the rotating assembly relative to the stationary assembly. The actuation assembly may enable a first amount of angular displacement of the rotating assembly. A cab of the electric vehicle may enable a second amount of angular displacement of the rotating assembly.

In various embodiments, the stationary assembly may comprise a fan assembly and a fan frame assembly coupled to the fan assembly. The rotating assembly may comprise a radiator frame assembly and a support frame assembly coupled to the radiator frame assembly. The actuation assembly may comprise a strap assembly coupled to the radiator frame assembly and the cab. The cab of the electric vehicle may enable the second amount of angular displacement of the rotating assembly through rotation of the cab. The strap assembly may comprise a first strap anchor assembly coupled to the radiator frame assembly and a second strap anchor assembly coupled to the cab. The radiator assembly may be configured to dissipate heat from at least one fuel cell module.

A radiator assembly may comprise a fan gasket, a fan assembly, a fan shroud, and an actuation assembly configured to enable and limit rotation of the fan shroud relative to the fan assembly to transition the radiator assembly between a stowed configuration and a deployed configuration. In the stowed configuration, the fan gasket may be in contact with the fan assembly and the fan shroud and form a seal between the fan assembly and the fan shroud. In the deployed configuration, the fan gasket may be in contact with one of the fan assembly or the fan shroud, thereby eliminating the seal between the fan assembly and the fan shroud.

In various embodiments, the fan gasket may be in contact with the fan shroud in the deployed configuration. The fan assembly may comprise a fan guard, a first vent flange, and a second vent flange. The fan shroud may comprise a cutout that corresponds with a geometry of the fan guard, the first vent flange, and the second vent flange.

The contents of this section are intended as a simplified introduction to the disclosure and are not intended to limit the scope of any claim. The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain exemplary principles of the disclosure.

DETAILED DESCRIPTION

Figure 1A:
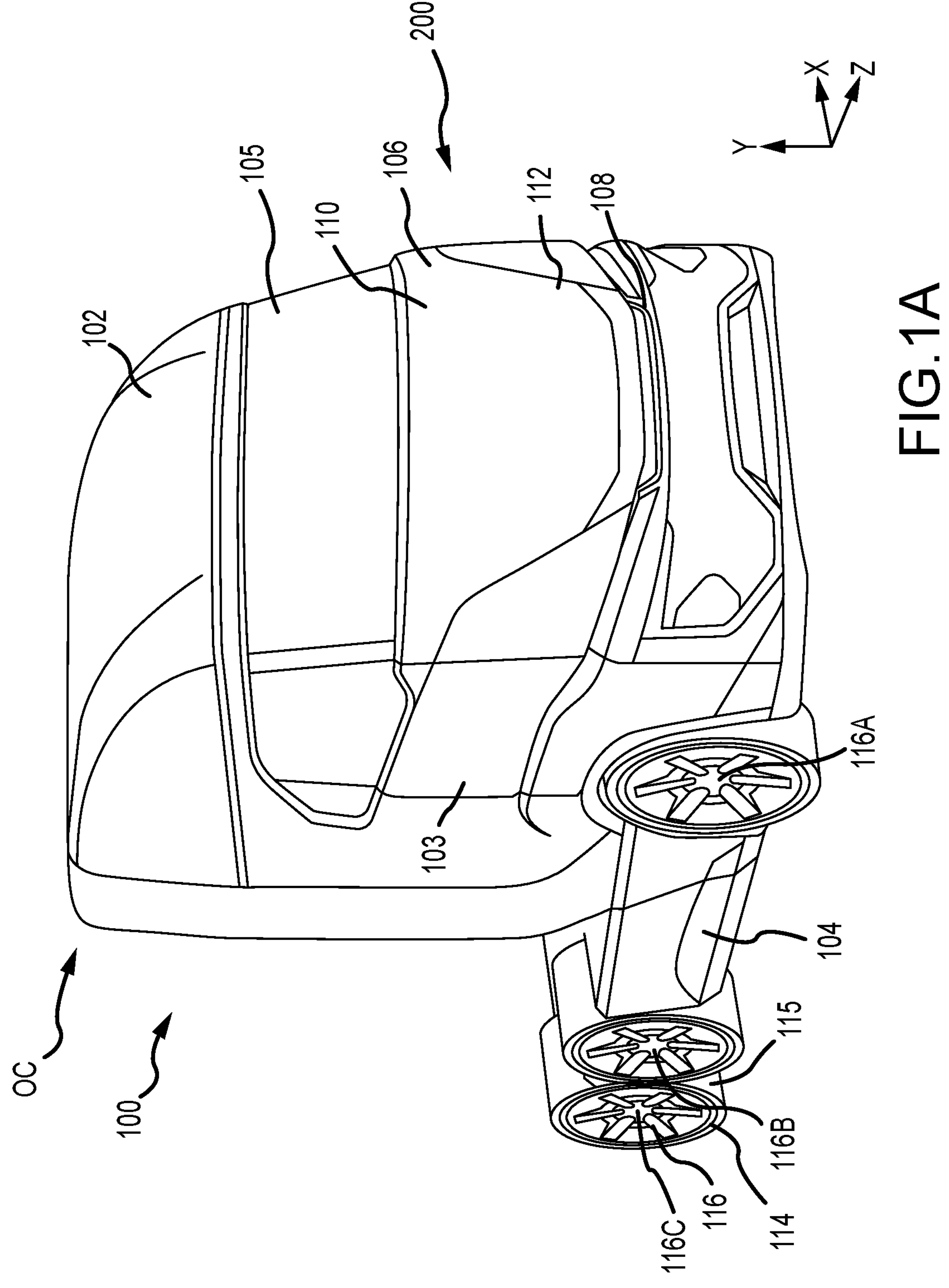
FIGS. 1A, 1B, 1C, 1D, and 1E illustrate perspective views of a vehicle in an operable configuration and various service configurations, in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any suitable order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

In the context of the present disclosure, methods, systems, and articles may find particular use in connection with medium- and heavy-duty commercial vehicles. However, various aspects of the disclosed embodiments may be adapted for performance in a variety of other systems, including passenger vehicles, off-road vehicles, watercraft, or any other mobile or stationary system requiring thermal management. As such, numerous applications of the present disclosure may be realized.

Medium- and heavy-duty commercial vehicles are large contributors to greenhouse gas emissions both domestically and internationally. For example, while forming only about five percent of vehicles on roads in the United States in 2020, the United States Environmental Protection Agency estimates that such vehicles accounted for approximately 25% of total emissions in the transportation sector. As a result, there has been a recent push to reduce greenhouse gas emissions from medium- and heavy-duty commercial vehicles, in part, through the electrification of these vehicles. As a result, traditional problems related to the packaging of internal combustion engines and related components have been replaced with problems related to the packaging and protection of electrical powertrain systems and components (such as high voltage battery systems or fuel cells), thermal management systems and components, and electronics, among others.

While packaging constraints exist for both internal combustion engine commercial vehicles and electric commercial vehicles, these constraints are more problematic for electric commercial vehicles because these vehicles typically have more total parts and more systems requiring thermal management. For example, modern electric commercial vehicles may include more than seven thousand parts and include thermal management systems for battery or fuel cell systems, e-axles, high voltage electronics, brake resistors, and the vehicle cabin. In the case of FCEVs, radiator assemblies associated with the fuel cell modules may be larger than radiator assemblies associated with diesel engines because the amount of heat rejection required by the fuel cell modules can be greater than that required by diesel engines. Moreover, certain methods of heat dissipation available for diesel engines (for example, partial heat dissipation through convective heat transfer from air flowing into the engine cavity and partial heat dissipation through engine exhaust) may not be as effective for FCEVs. As a result, new solutions may be required to allow access to certain areas of these vehicle to enable service and maintenance while still allowing for adequate cooling of critical vehicle systems.

Accordingly, with reference to FIG. 1A, a vehicle 100 is illustrated from a perspective view, in accordance with various embodiments. As illustrated in FIG. 1A, vehicle 100 is a heavy-duty FCEV. Vehicle 100 is a tractor unit which may tow a trailer unit configured to hold and transport cargo. Vehicle 100 may comprise a class 8, class 7, class 6, or any other weight classification of tractor-trailer combination. While described herein as a heavy-duty FCEV, vehicle 100 is not limited in this regard and may comprise a passenger vehicle or light, medium, or heavy-duty BEV or internal combustion engine vehicle (ICEV). As described herein, vehicle 100 extends in a longitudinal direction along the Z-axis from a rear of vehicle 100 to a front of vehicle 100. Vehicle 100 extends in a transverse direction along the X-axis from a passenger side of vehicle 100 to a driver side of vehicle 100. Finally, vehicle 100 extends in a vertical direction along the Y-axis from a ground surface on which vehicle 100 drives to a top of vehicle 100. Relative positions of various components discussed herein refer to the positions of such components when vehicle 100 is in an operable configuration OC (when the radiator assembly 200 is in a stowed configuration) as illustrated.

Vehicle 100 comprises a cab 102 supported by a chassis 104. Cab 102 may be configured to shelter one or more vehicle operators or passengers from the external environment. In various embodiments, cab 102 comprises a door 103 configured to allow ingress and egress into and from cab 102, one or more seats, a windshield 105, and numerous accessories configured to improve comfort for the operator and/or passenger(s). As illustrated in FIGS. 1A, B, 1C, 1D, and 1E, vehicle 100 comprises a cab-over or cab-forward style tractor unit, but is not limited in this regard and may comprise any style of tractor unit including a conventional or American cab style tractor unit. Cab 102 further comprises a grille assembly 106 configured to permit airflow into and out of vehicle 100 for heat transfer purposes and a front bumper fascia 108 positioned adjacent to and vertically below grille assembly 106.

Chassis 104 is configured to support various components and systems of vehicle 100, including cab 102. Chassis 104 may comprise a ladder-like structure with various mounting points for vehicle 100's powertrain components, suspension, thermal management systems, electronics, fluid reservoirs, and other systems and components. In various embodiments, chassis 104 supports and is coupled to one or more power generating systems 110 configured to provide power to vehicle 100's drivetrain and one or more thermal management systems 112 configured to provide heating or cooling for various vehicle systems including its battery and/or fuel cell systems, e-axles, high voltage electronics, brake resistors, and/or cab 102. In various embodiments, the power generating system 110 may comprise one or more fuel cell modules and/or one or more high voltage battery systems.

Vehicle 100 further comprises wheels 114 comprising one or more tires 115 coupled to one or more axles 116 (e.g., 116A, 116B, and 116C) and configured to roll along a driving surface. In various embodiments, vehicle 100 comprises a pair of single wheels coupled to a front axle 116A, and a pair of dual wheels coupled to two rear axles (first rear axle 116B and second rear axle 116C). One or more of the axles may be driven. For example, in various embodiments, vehicle 100 may comprise a 6×2 configuration with a single driven axle; however, vehicle 100 is not limited in this regard and may comprise a 4×2, 6×4, 6×6, or other suitable configuration. In various embodiments, vehicle 100 may further comprise a radiator assembly 200 which may form a portion of thermal management systems 112.

Figure 1B:
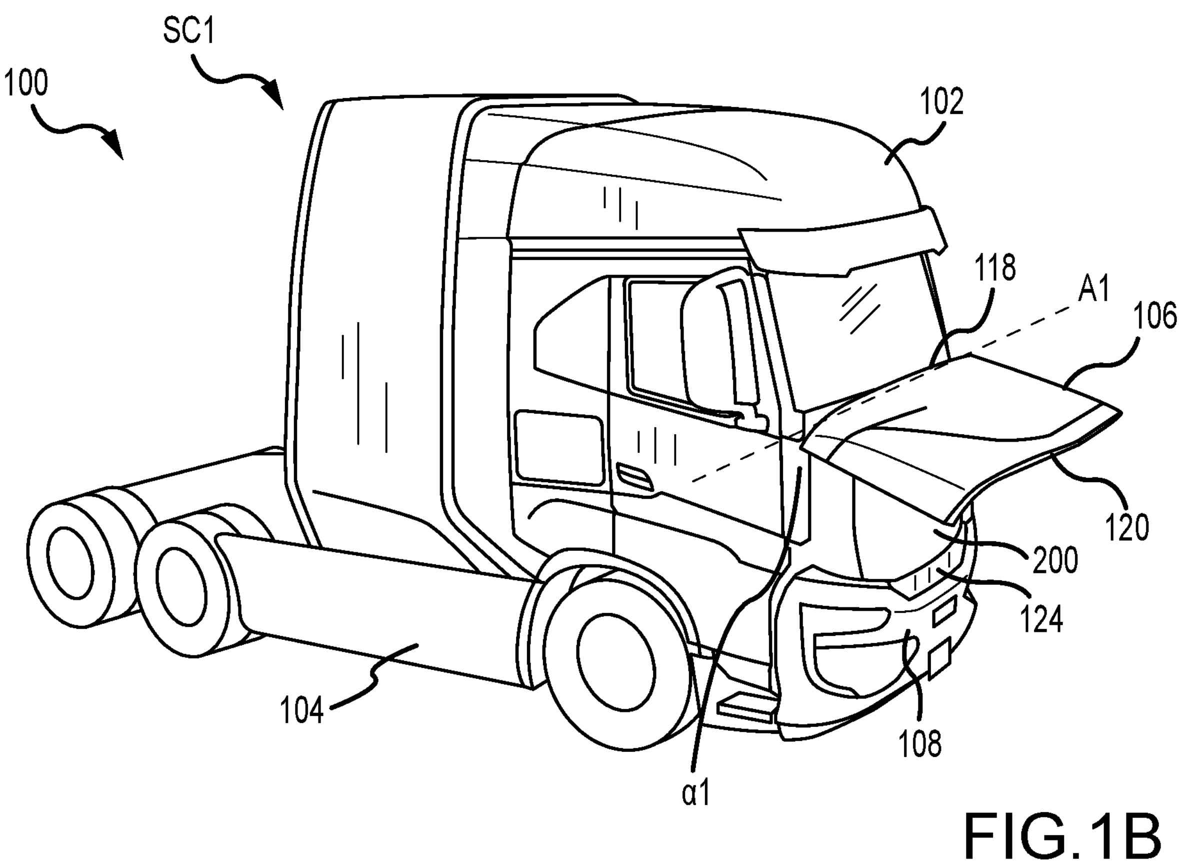

Referring now to FIGS. 1B, IC, 1D, and 1E, vehicle 100 is illustrated in various service configurations, in accordance with various embodiments. The illustrated service configurations differ from an operable configuration OC of vehicle 100, which corresponds with the configuration of vehicle 100 during normal operation. The service configurations illustrated in FIGS. 1B, 1C, 1D, and 1E may be required in order to allow users and/or service technicians to repair, remove, replace, and troubleshoot various components and systems beneath cab 102 and above chassis 104, for example. More specifically, the various service configurations may permit access to power generating system 110 and/or thermal management system 112 of FIG. 1A, among other systems and components.

With reference to FIG. 1B, in a first service configuration SC1, grille assembly 106 is rotated away from cab 102 in order to expose radiator assembly 200 and other systems and components between cab 102 and chassis 104. The first service configuration SC1 may also permit the radiator assembly 200 to rotate without contacting the grille assembly 106 as required by the third service configuration SC3, which will be discussed in detail below. The first service configuration SC1 may permit service and repair of certain portions of vehicle 100, including a front surface of radiator assembly 200, without the need to transition the vehicle 100 into the second, third, or fourth service configurations.

In first service configuration SC1, grille assembly 106 may be rotated about one or more hinges 118 rotatably coupling the grille assembly 106 to cab 102 thereby exposing an access panel 124 coupled to front bumper fascia 108. One or more latch assemblies 120 coupled to an inner surface of grille assembly 106 and outer service of cab 102 permit the grille assembly 106 to engage and disengage with cab 102 depending on whether vehicle 100 is in the operable configuration or one of the service configurations. One or more dampers coupled to grille assembly 106 and cab 102 assist in the rotation of grille assembly 106 relative to cab 102, support at least a portion of grille assembly 106 when rotated upward, and prevent inadvertent closure of grille assembly 106.

To achieve first service configuration SC1 from operable configuration OC, a user or service technician actuates the latch assemblies 120, thereby disengaging the grille assembly 106 from cab 102, and may rotate grille assembly 106 upward in the direction illustrated by rotating the grille assembly 106 about hinges 118. Stated otherwise, hinges 118 define a first axis of rotation A1 about which grille assembly 106 rotates relative to cab 102. In various embodiments, grille assembly 106 may be configured to rotate between approximately 90° and 130°, between approximately 100° and 120°, or approximately 110° relative to cab 102 as illustrated by a first angle $\alpha$1. While illustrated herein as rotating about a transversely extending axis of rotation, it should be appreciated that grille assembly 106 may be configured to rotate in any direction relative to cab 102, including about a vertical axis of rotation in various embodiments.

Figure 1C:
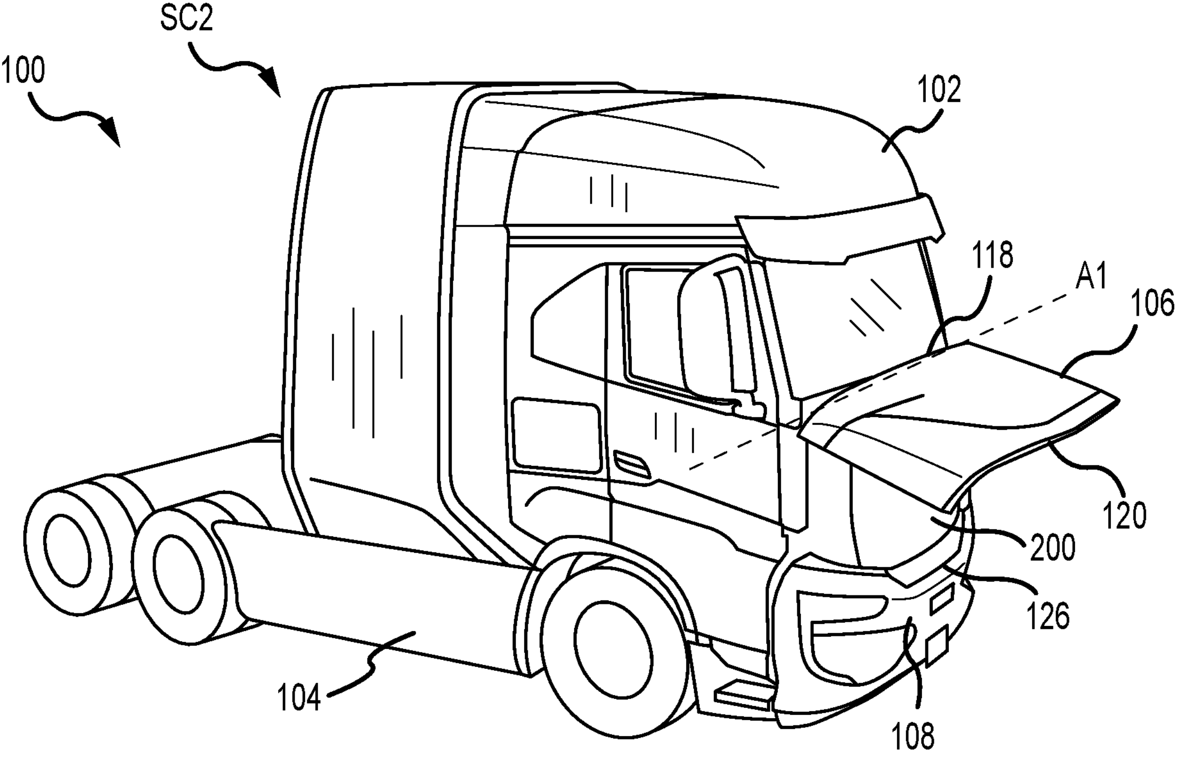

With additional reference to FIG. 1C, in the second service configuration SC2, an access panel 124 of FIG. 1B is removed from front bumper fascia 108. In various embodiments, access panel 124 is positioned vertically below grille assembly 106. Second service configuration SC2 not only permits service of components and areas not accessible in first service configuration SC1 (for example, the lower portions of radiator assembly 200), but also creates the physical clearance needed for third service configuration SC3. More specifically, by rotating the grille assembly 106 upward about hinges 118 in first service configuration SC1, one or access panel mounting brackets 126 can be exposed. Access panel mounting brackets 126 may be configured to receive one or more fasteners to couple the access panel 124 to or decouple the access panel 124 from front bumper fascia 108. Further, one or more mechanical mating elements (not shown) integral with access panel 124, which may be configured to interface with an equal number of mechanical mating elements (not shown) on front bumper fascia 108, may also be exposed. In various embodiments, the above stated mechanical mating elements may comprise tongue and groove, mortise and tenon, dovetail, or other type of joint configured to removably couple the access panel 124 to front bumper fascia 108.

To achieve second service configuration SC2 from first service configuration SC1, the user or service technician removes the one or more fasteners coupling the access panel mounting brackets 126 to front bumper fascia 108 and decouple the mechanical mating elements of access panel 124 from the mechanical mating elements of front bumper fascia 108. After doing so, access panel 124 can be completely removed from cab 102, thereby exposing the lower portions of radiator assembly 200 and achieving second service configuration SC2. While discussed herein as being completely removed from cab 102 in second service configuration SC2, it should be appreciated that access panel 124 may be rotated downward about a transversely extending axis relative to cab 102 and/or front bumper fascia 108 to achieve second service configuration SC2 in various embodiments. As a result, access panel 124 need not be completely removed to permit access or enable second service configuration SC2 in various embodiments.

Figure 1D:
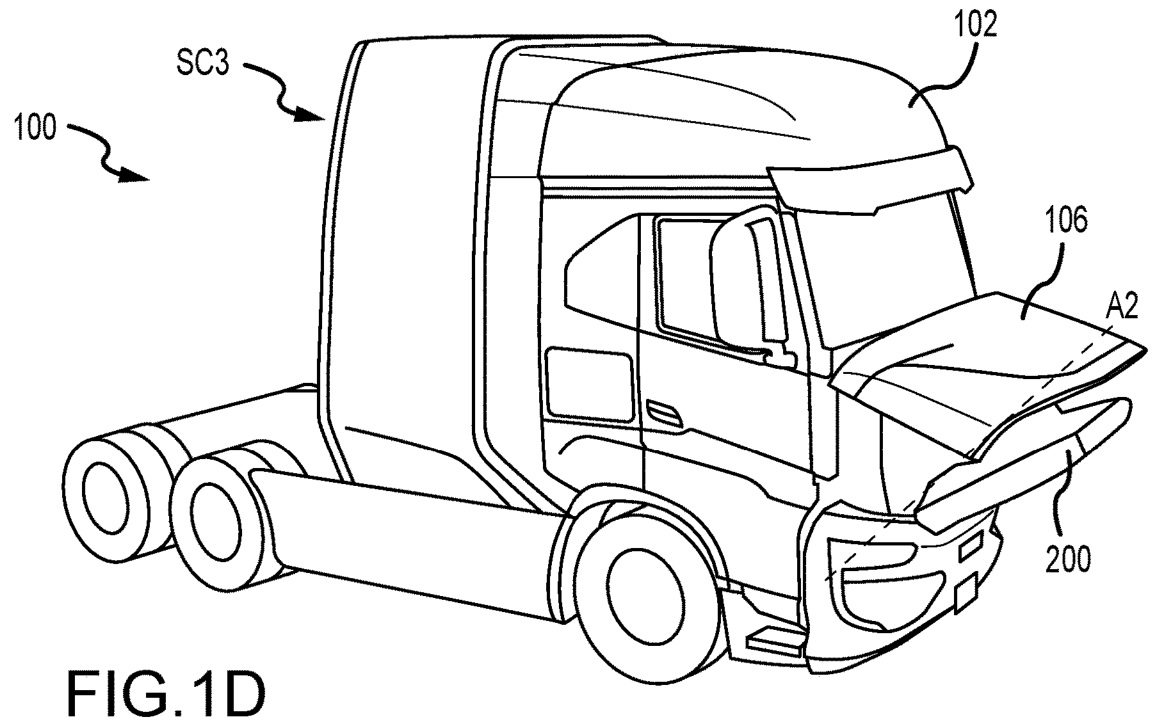

Referring now to FIG. 1D, vehicle 100 is illustrated in a third service configuration SC3, in accordance with various embodiments. In third service configuration SC3, radiator assembly 200 is rotated about a second axis of rotation A2. Second axis of rotation A2 may comprise a transversally extending axis that is parallel to and offset in the vertical and longitudinal directions from first axis of rotation A1 about which grille assembly 106 rotates relative to cab 102.

Rotating the radiator assembly 200 as shown in third service configuration SC3 not only permits users and service technicians to access components positioned behind radiator assembly 200 (such as power generating system 110 and/or thermal management system 112) but also permits cab 102 to rotate forward as required by fourth service configuration SC4 without physically interfering with radiator assembly 200.

Figure 1E:
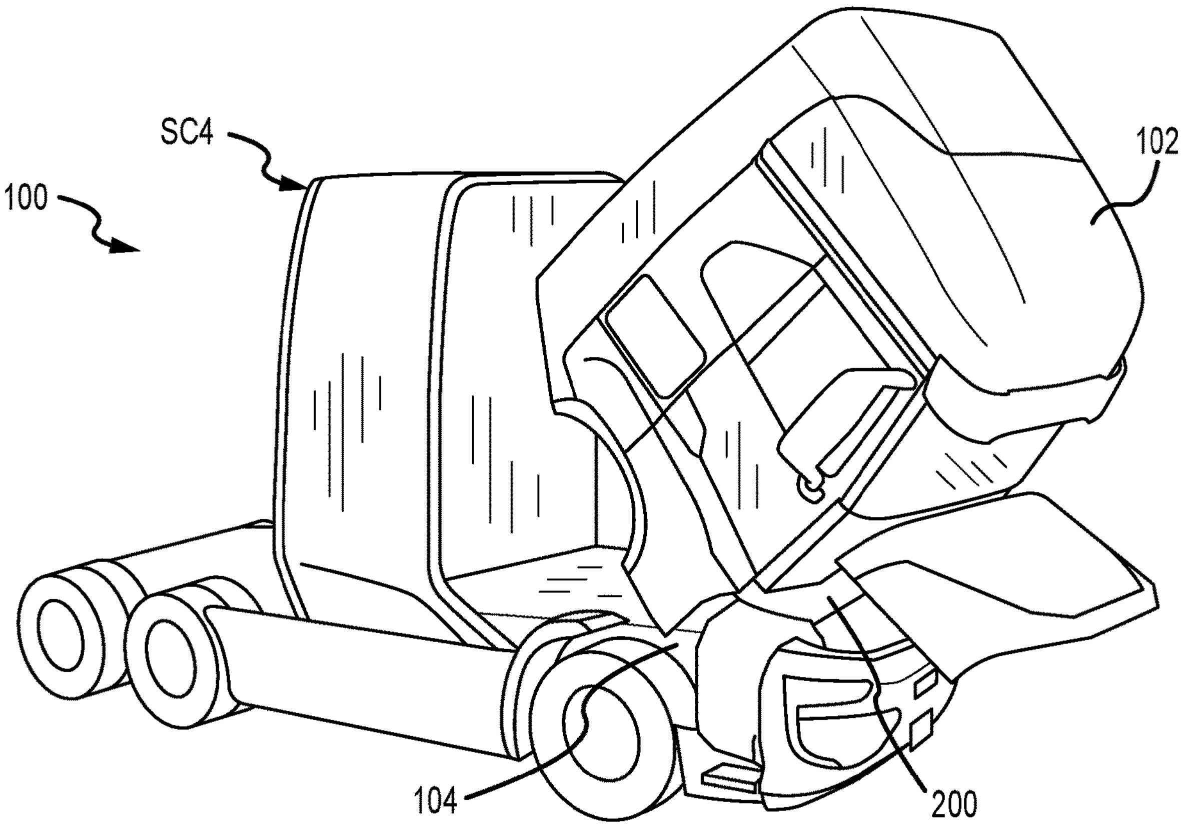

Referring now to FIG. 1E, vehicle 100 is illustrated in fourth service configuration SC4. In fourth service configuration SC4, cab 102 of vehicle 100 is rotated forward relative to chassis 104 to further expose the systems and components positioned between cab 102 and chassis 104. As discussed above, deploying the radiator assembly 200 in third service configuration SC3 allows cab 102 to be rotated forward as required in fourth service configuration SC4 without contacting the radiator assembly 200. While not illustrated in detail, cab 102 may comprise one or more pins coupled to a lower surface of cab 102 and configured to interact with an equal number of pin locks coupled to a rear cab suspension assembly, which may be coupled to chassis 104. The above-stated pin locks may be configured to lock the pins in place (and thereby restrict movement of cab 102) when cab 102 is stowed (for example, in operable configuration OC, first service configuration SC1, second service configuration SC2, and third service configuration SC3) and may be configured to release the pins to allow cab 102 to rotate as required by fourth service configuration SC4. Cab 102 may be rotatably mounted to a front cab suspension, which may also be coupled to chassis 104. In various embodiments, a pneumatic piston coupled to chassis 104 and cab 102 may provide the motive force required to rotate cab 102.

Figure 2A:
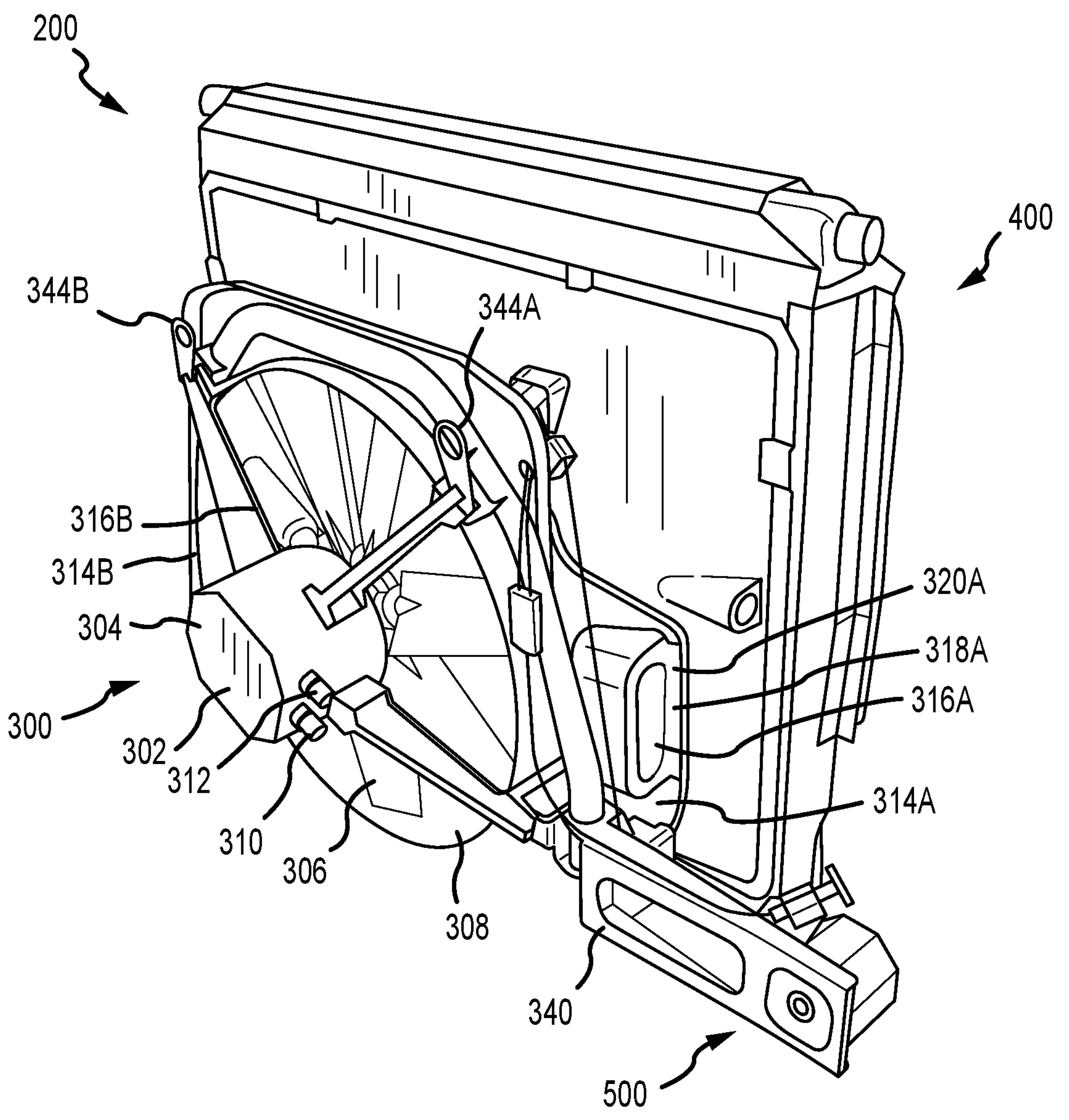
FIGS. 2A, 2B, and 2C illustrate various views of a radiator assembly in a stowed configuration, in accordance with various embodiments.
Figure 2B:
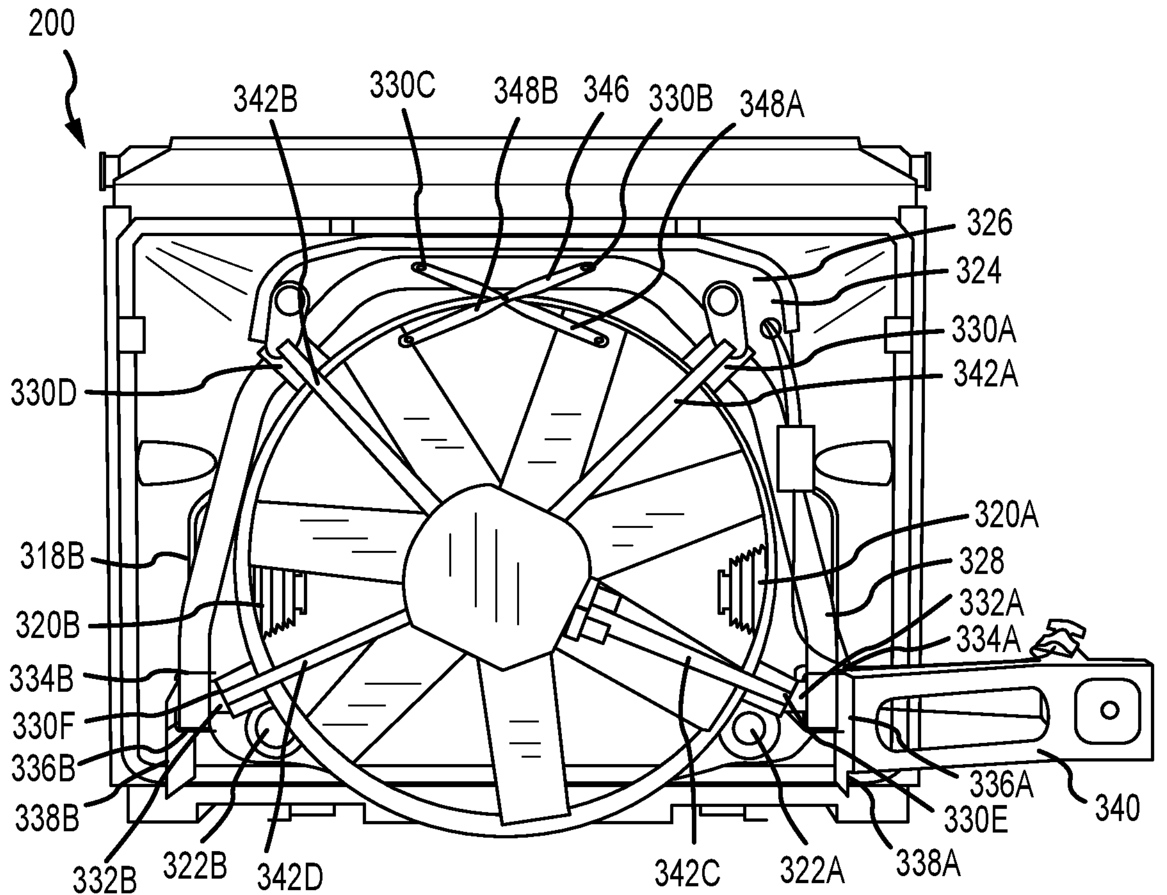
Figure 2C:
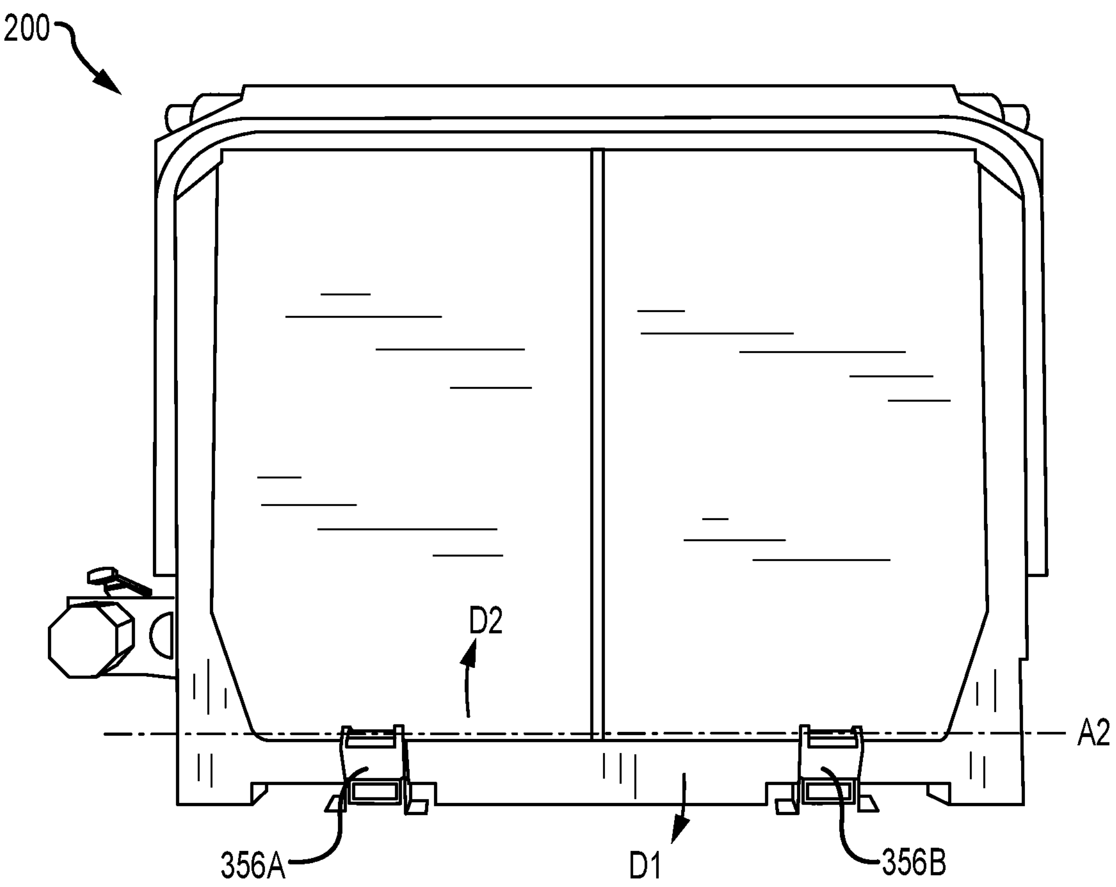
Figure 3A:
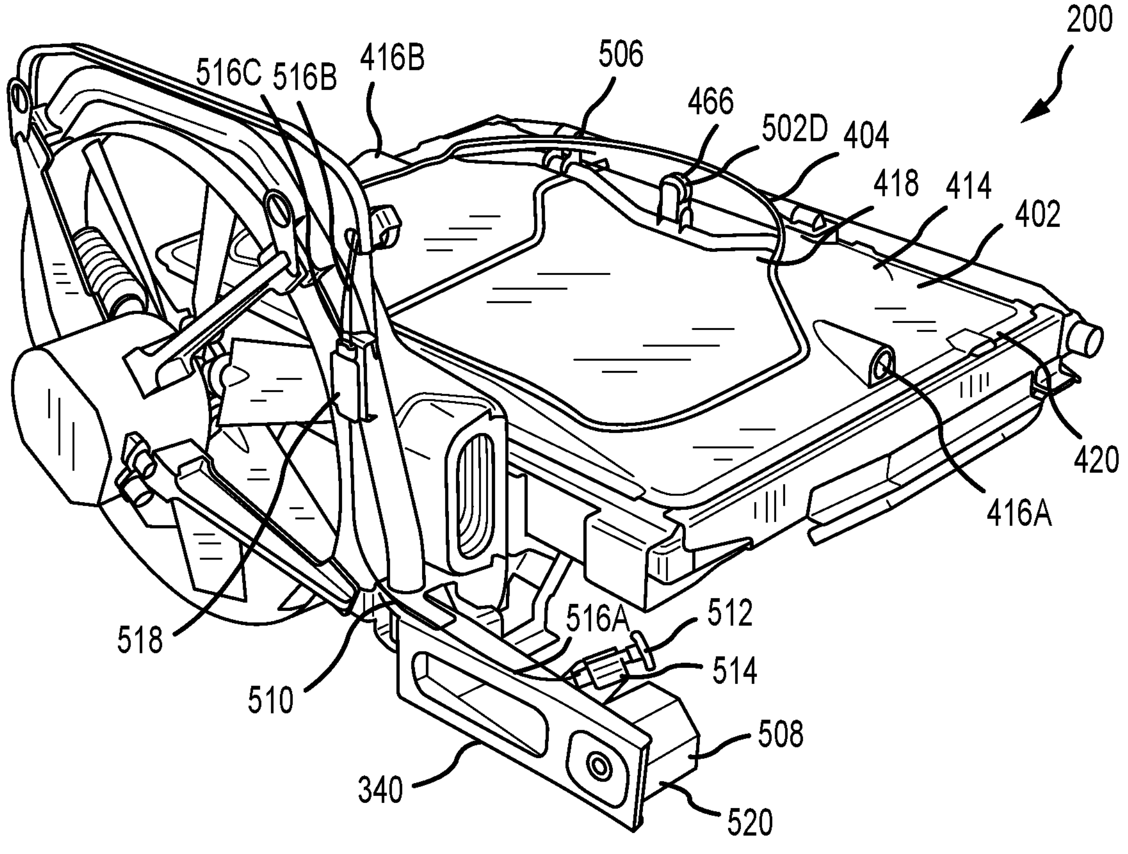
FIGS. 3A and 3B illustrate various views of a radiator assembly in a deployed configuration, in accordance with various embodiments.
Figure 3B:
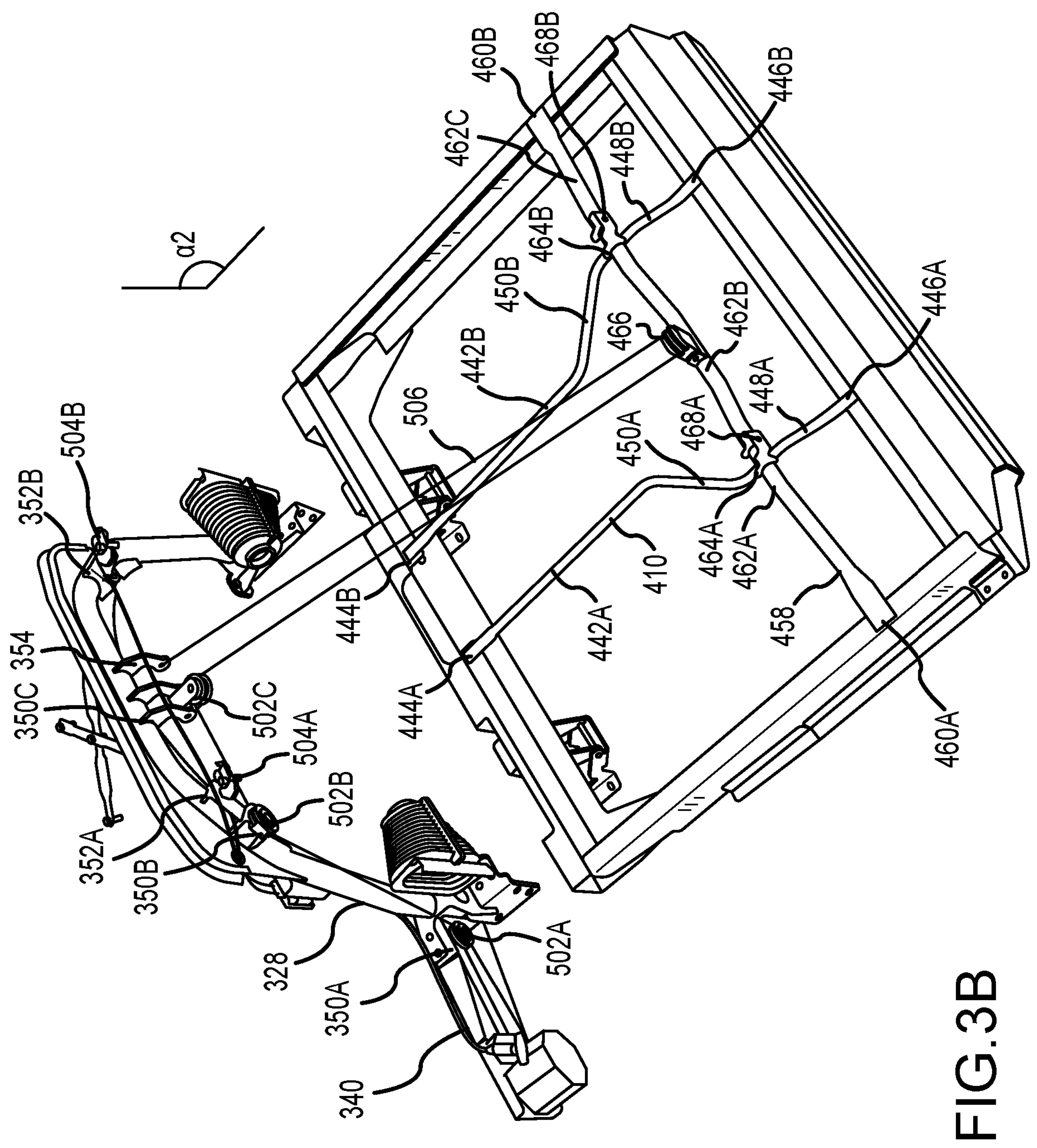
Figure 4A:
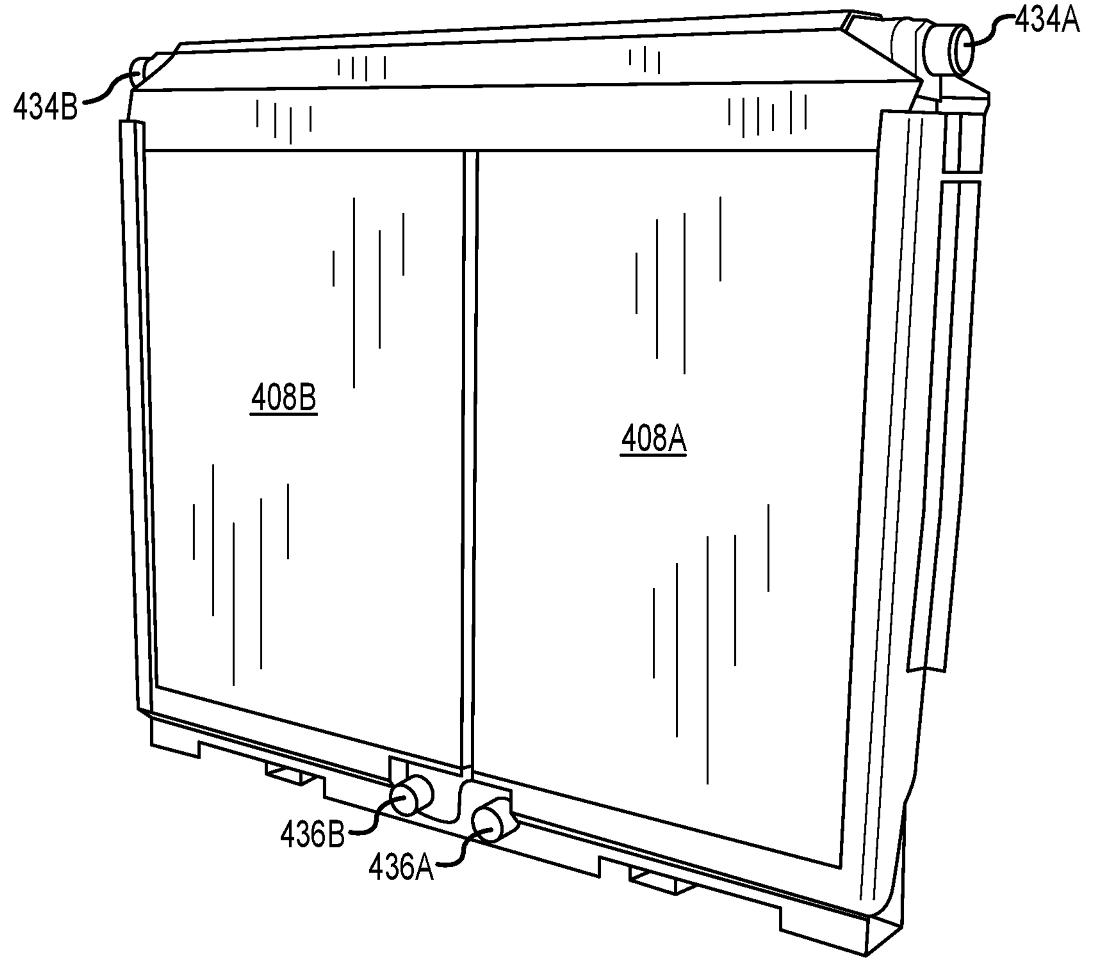
FIGS. 4A and 4B illustrate partial assemblies of a radiator assembly, in accordance with various embodiments.
Figure 4B:
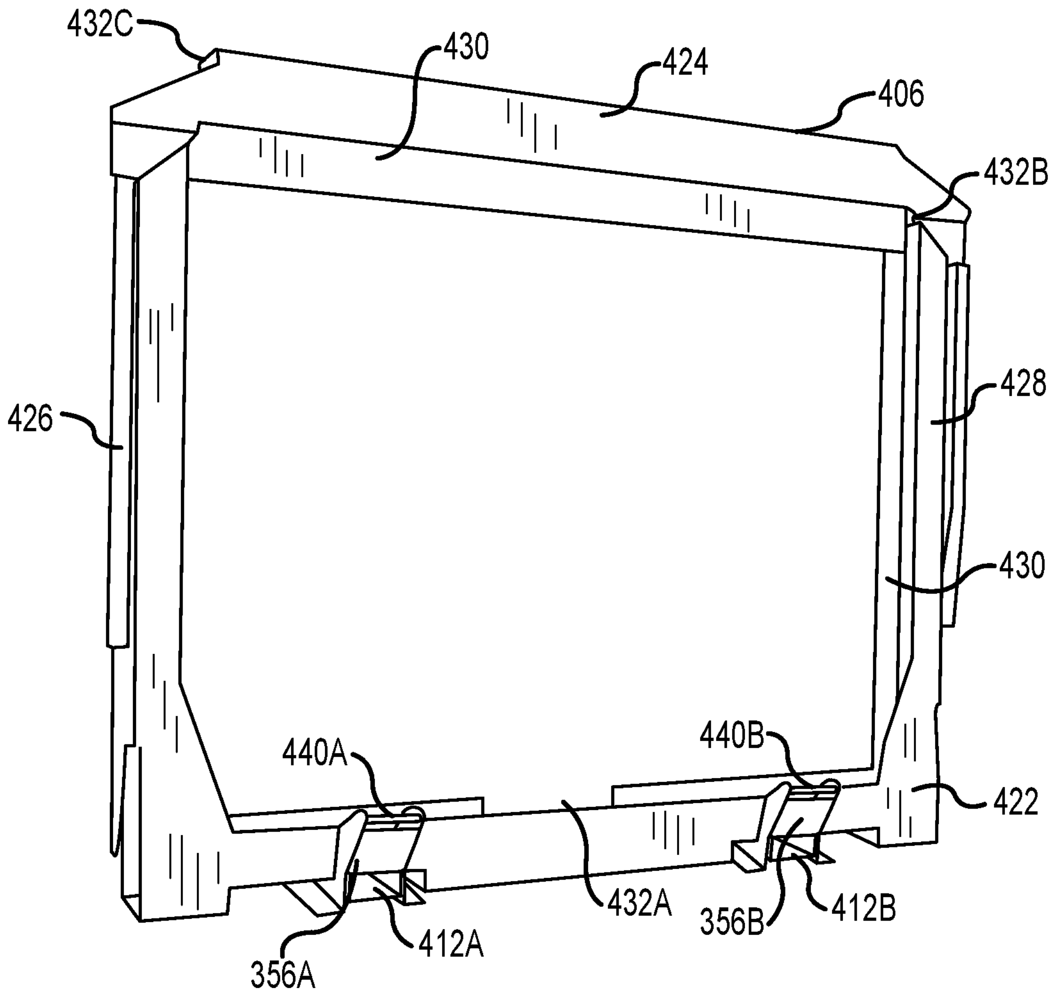

Referring now to FIGS. 2A, 2B, and 2C, radiator assembly 200 is illustrated from various views in a stowed configuration, in accordance with various embodiments. While discussed herein as comprising a radiator assembly, radiator assembly 200 is not limited in this regard and may comprise any heat exchanger assembly, for example, a condenser, evaporator, or other system capable of facilitating heat transfer in order to provide heat to or remove heat from any system or component of vehicle 100 of FIGS. 1A, 1B, 1C, 1D, and 1E. As discussed herein, radiator assembly 200 forms a portion of a thermal management system for one or more fuel cell modules designed to provide electrical power to the drive axles or e-axles of vehicle 100. While described as comprising a fuel cell radiator, radiator assembly 200 is not limited in this regard and may be configured to assist in the thermal management of other systems of vehicle 100, including vehicle 100's braking system, cab 102 of FIGS. 1A, 1B, 1C, 1D, and 1E, high voltage battery systems or electronics, or drive axle(s). In general, radiator assembly 200 may be configured to receive heated coolant from the one or more fuel cell modules and dissipate heat from the coolant to the ambient environment external to cab 102 via convective heat transfer.

In various embodiments, radiator assembly 200 comprises a stationary assembly 300, a rotating assembly 400, and an actuation assembly 500. Actuation assembly 500 is configured to actuate the rotating assembly 400 to allow rotating assembly 400 to rotate relative to stationary assembly 300. More specifically, actuation assembly 500 is configured to rotate rotating assembly 400 about second axis of rotation A2 in a first direction D1 relative to stationary assembly 300 to transition the vehicle 100 from the second service configuration SC2 to the third service configuration SC3. Actuation assembly 500 is further configured to rotate rotating assembly 400 about second axis of rotation A2 in a second direction D2 relative to stationary assembly 300 to transition the vehicle 100 from the third service configuration SC3 to the second service configuration SC2. By allowing rotating assembly 400 to rotate relative to stationary assembly 300, cab 102 is permitted to rotate to enable the fourth service configuration SC4 from the third service configuration SC3 without physically interfering with one or more components of stationary assembly 300.

In various embodiments, stationary assembly 300 comprises a fan assembly 302 configured to assist in convective heat transfer as heated coolant flows through radiator assembly 200. Fan assembly 302 may comprise an axial fan comprising a fan housing 304 comprising an electric motor, rotor, stator, and one or more bearings (not shown) in various embodiments. Fan assembly 302 further comprises a plurality of blades 306 extending radially from the rotor to a fan guard 308 that extends circumferentially around the plurality of blades 306. Fan assembly 302 further comprises a communications connector 312 and a power connector 310 extending through fan housing 304 configured to receive communications signals and electrical power, respectively. In various embodiments, communications connector 312 is configured to receive controller area network (CAN) signals from an onboard control module (for example, a thermal management module) to control the operation of fan assembly 302. Power connector 310 is configured to receive electric current from the high voltage battery system of vehicle 100 in order to power the fan assembly 302. In various embodiments, fan assembly 302 comprises a diameter of approximately 31 inches and includes seven blades 306, however, fan assembly 302 is not limited in this regard and may comprise any suitable diameter and number of blades. Moreover, while illustrated herein as comprising a single fan assembly 302, radiator assembly 200 is not limited in this regard and may comprise multiple fans positioned transversely, longitudinally, vertically, or any combination thereof in various embodiments.

With continued reference to FIGS. 2A, 2B, and 2C, fan assembly 302 further comprises a first vent flange 314A and a second vent flange 314B. In various embodiments, first vent flange 314A and second vent flange 314B are integral with and extend radially outward from fan guard 308 and are configured to provide a first vent 316A and a second vent 316B, respectively, for fan assembly 302. In various embodiments, first vent flange 314A and second vent flange 314B extend forward of the remaining portions of fan guard 308 in the longitudinal direction. A first vent passage 318A, which is configured to receive a first vent insert 320A, is positioned rearward of first vent flange 314A. Similarly, a second vent passage 318B, which is configured to receive a second vent insert 320B, is positioned rearward of second vent flange 314B. In various embodiments, first vent passage 318A (and first vent insert 320A) and second vent passage 318B (and second vent insert 320B) extend radially from fan guard 308 and are configured to enable stagnant air to exit the fan assembly 302 to increase airflow and cooling efficiency.

In various embodiments, fan assembly 302 further comprises a first coolant outlet aperture 322A and a second coolant outlet aperture 322B. First coolant outlet aperture 322A is positioned vertically below first vent 316A and positioned radially outward of fan guard 308. Similarly, second coolant outlet aperture 322B is positioned vertically below second vent 316B and positioned radially outward of fan guard 308. First coolant outlet aperture 322A and second coolant outlet aperture 322B may be configured to receive a first coolant outlet line and a second coolant outlet line, respectively, which may be configured to return cooled coolant from radiator assembly 200 to one or more pumps of thermal management system 112 of FIGS. 1A, 1B, 1C, 1D, and 1E. While illustrated as being positioned on a lower portion of fan assembly 302, first coolant outlet aperture 322A and second coolant outlet aperture 322B are not limited in this regard and may be positioned in any suitable position on fan assembly 302 based on packaging constraints.

Stationary assembly 300 further comprises a fan frame assembly 324 configured to mount stationary assembly 300 (including fan assembly 302) directly or indirectly to chassis 104 of FIGS. 1A, 1B, 1C, 1D, and 1E. More specifically, in various embodiments, fan frame assembly 324 comprises a frame plate 326 integral with and extending vertically upward from a frame bracket 328. Frame plate 326 comprises a substantially planar surface that may be welded to or formed together with frame bracket 328. Frame bracket 328 comprises a cylindrical, bent metal structure positioned radially outward of and extending circumferentially around at least a portion of fan guard 308. Frame bracket 328 further comprises a plurality of mounting blocks 330A-330D integral with a rear portion of frame bracket 328 and configured to receive one or more fasteners. In various embodiments, frame bracket 328 comprises a first mounting block 330A, a second mounting block 330B, a third mounting block 330C, and a fourth mounting block 330D.

In various embodiments, fan frame assembly 324 further comprises a first attachment bracket 332A and a second attachment bracket 332B. First attachment bracket 332A comprises a first frame aperture 334A and a second frame aperture 336A positioned vertically below first frame aperture 334A. Similarly, second attachment bracket 332B comprises a first frame aperture 334B and a second frame aperture 336B positioned vertically below first frame aperture 334B. A first end of frame bracket 328 is configured to be inserted into first frame aperture 334A and second frame aperture 336A of first attachment bracket 332A and a second end of frame bracket 328 is configured to be inserted into first frame aperture 334B and second frame aperture 336B of second attachment bracket 332B. First attachment bracket 332A further comprises a fifth mounting block 330E and a first attachment plate 338A configured to be directly or indirectly mounted to chassis 104 via one or more fasteners. Second attachment bracket 332B further comprises a sixth mounting block 330F and a second attachment plate 338B configured to be directly or indirectly mounted to chassis 104 via one or more fasteners. In various embodiments, second attachment bracket 332B further comprises a winch mount 340 extending transversely relative to frame bracket 328.

Returning momentarily to fan assembly 302, fan assembly 302 further comprises one or more radially extending spokes 342A-342D. Spokes 342A-342D may be configured to mount fan assembly 302 to frame bracket 328, first attachment bracket 332A, and/or second attachment bracket 332B and may resist tensile and compressive radial forces. As illustrated, fan assembly 302 comprises a first spoke 342A, a second spoke 342B, a third spoke 342C, and a fourth spoke 342D, however, fan assembly 302 is not limited in this regard and may comprise more or less spokes in various embodiments. Further, while illustrated as being substantially equally spaced apart in the circumferential direction, fan assembly 302 is not limited in this regard and spokes 342A-342D may be positioned unequally in various embodiments.

Each of spokes 342A-342D is coupled to fan housing 304 on a first side and coupled to a given mounting block on a second side. More specifically, first spoke 342A is coupled to fan housing 304 on a first side via a first spoke mount and coupled to first mounting block 330A of frame bracket 328 on a second side. A first hoist ring 344A, which is configured to allow radiator assembly 200 to be lowered towards or lifted away from vehicle 100 during assembly/disassembly, may be positioned between first spoke 342A and first mounting block 330A. Second spoke 342B is coupled to fan housing 304 on a first side via a second spoke mount and coupled to second mounting block 330B of frame bracket 328 on a second side. A second hoist ring 344B, which also is configured to allow radiator assembly 200 to be lowered towards or lifted away from vehicle 100 during assembly/disassembly, may be positioned between second spoke 342B and second mounting block 330B. Third spoke 342C is coupled to fan housing 304 on a first side via a third spoke mount and coupled to fifth mounting block 330E of first attachment bracket 332A on a second side. Fourth spoke 342D is coupled to fan housing 304 on a first side via a fourth spoke mount and coupled to sixth mounting block 330F of second attachment bracket 332B on a second side. Each of first spoke 342A, second spoke 342B, third spoke 342C, and fourth spoke 342D may be oriented such that the second side is positioned longitudinally forward of the first side. Each of spokes 342A-342D is coupled to fan housing 304 and its respective one of mounting blocks 330A-330F via one or more fasteners in various embodiments. Each of spokes 342A-342D may further be coupled to fan guard 308 at a location radially outward of fan guard 308 via one or more fasteners. Stated otherwise, each spoke 342 is coupled to fan housing 304, fan guard 308, and its respective one of mounting blocks 330A-330F in various embodiments.

In various embodiments, frame bracket 328 may be coupled indirectly to chassis 104 of vehicle 100 via a cross connector 346. Cross connector 346 comprises a first crossmember 348A, which may be coupled to third mounting block 330C on a first end and coupled to a thermal system bracket (not shown) on a second end. Cross connector 346 further comprises a second crossmember 348B, which may be coupled to second mounting block 330B on a first end and coupled to the thermal system bracket (not shown) on a second end. In various embodiments, first crossmember 348A and second crossmember 348B are coupled together and to their respective mounting blocks and the thermal system bracket via one or more fasteners.

In various embodiments, stationary assembly 300 further comprises one or more features configured to interface with or interact with one or more features of actuation assembly 500 and/or rotating assembly 400. More specifically, with additional reference to FIGS. 3A, 3B, 4A, and 4B, stationary assembly 300 further comprises winch mount 340 and a first pulley mount 350A which also form a portion of second attachment bracket 332B. Winch mount 340 is configured to be coupled to and receive a winch (discussed further below) positioned near an end of a transverse extension that forms a portion of second attachment bracket 332B. First pulley mount 350A may be positioned adjacent to frame bracket 328 and positioned vertically between first frame aperture 334B and second frame aperture 336B of second attachment bracket 332B. First pulley mount 350A may be configured to mount a first pulley 502A (which forms a portion of actuation assembly 500) to winch mount 340 and allow first pulley 502A to rotate about a longitudinal axis extending through a centerline of first pulley 502A.

In various embodiments, in addition to winch mount 340 and first pulley mount 350A, stationary assembly 300 further comprises a second pulley mount 350B, a third pulley mount 350C, a first latch mount 352A, a second latch mount 352B, and a winch cable terminal 354. Stationary assembly 300 further comprises a first fixed actuation bracket 356A and a second fixed actuation bracket 356B as will be discussed in further detail below. Second pulley mount 350B may be integral with or coupled to frame bracket 328 and positioned longitudinally forward of first mounting block 330A. Second pulley mount 350B is configured to mount a second pulley 502B (which forms a portion of actuation assembly 500) to frame bracket 328 and allow second pulley 502B to rotate about a longitudinal axis extending through a centerline of second pulley 502B.

First latch mount 352A, which also may be integral with or coupled to frame bracket 328, is positioned adjacent to second pulley mount 350B in the transverse direction. First latch mount 352A is configured to mount a first latch 504A (which forms a portion of actuation assembly 500) to frame bracket 328. Third pulley mount 350C may also be integral with or coupled to frame bracket 328 and positioned longitudinally forward of second mounting block 330B. Third pulley mount 350C is configured to mount a third pulley 502C (which forms a portion of actuation assembly 500) to frame bracket 328 and allow third pulley 502C to rotate about a vertical axis extending through a centerline of third pulley 502C. Third pulley mount 350C may be offset from second mounting block 330B in the transverse direction such that third pulley mount 350C is closer to a transverse midpoint of vehicle 100 than second mounting block 330B.

Second latch mount 352B may also be integral with or coupled to frame bracket 328 and positioned longitudinally forward of third mounting block 330C. Second latch mount 352B may be offset from third mounting block 330C in the transverse direction such that second latch mount 352B is closer to the transverse midpoint of vehicle 100 than third mounting block 330C. Second latch mount 352B is configured to mount a second latch 504B (which forms a portion of actuation assembly 500) to frame bracket 328. Winch cable terminal 354 may also be integral with or coupled to frame bracket 328 and positioned transversely between third pulley mount 350C and second latch mount 352B. Winch cable terminal 354 is configured to fix an end of a winch cable 506 (which forms a portion of actuation assembly 500) to frame bracket 328.

Moving on and with continued reference to FIGS. 2A, 2B, 2C, 3A, 3B, 4A, and 4B, rotating assembly 400 comprises a fan shroud 402, a fan gasket 404, a radiator frame assembly 406, a first radiator 408A, a second radiator 408B, a support frame assembly 410, a first actuation bracket 412A, and a second actuation bracket 412B. While discussed herein as forming a portion of rotating assembly 400, fan shroud 402 and fan gasket 404 are not limited in this regard and either or both may instead form a portion of stationary assembly 300 in various embodiments. Fan shroud 402 is configured maximize airflow through first radiator 408A and second radiator 408B by directing airflow to fan assembly 302. Radiator frame assembly 406 is configured to contain and position the first radiator 408A and second radiator 408B and provide one or more mounting surfaces for support frame assembly 410. Support frame assembly 410 is configured to support radiator frame assembly 406, first radiator 408A, and second radiator 408B and engage and disengage with stationary assembly 300. First actuation bracket 412A and second actuation bracket 412B are configured to be rotatably coupled to first fixed actuation bracket 356A and second fixed actuation bracket 356B, respectively, and define second axis of rotation A2.

In various embodiments, fan shroud 402 comprises a shroud casing 414, a first return line inlet aperture 416A, and a second return line inlet aperture 416B. Shroud casing 414 comprises a cutout 418 that substantially aligns the geometry of fan guard 308, first vent flange 314A, and second vent flange 314B. Fan gasket 404, which may comprise an elastomeric material, is configured to mate with and form a seal with cutout 418 when radiator assembly 200 is in a stowed configuration (such as operable configuration OC, first service configuration SC1, and second service configuration SC2). Stated otherwise, fan gasket 404 may form an airtight or substantially airtight seal between stationary assembly 300 and rotating assembly 400 when radiator assembly 200 is in the stowed configuration. The seal formed by fan gasket 404 may be configured to maximize the amount of air directed to fan assembly 302 by limiting the amount of air that escapes the radiator assembly 200 between shroud casing 414 and fan guard 308, first vent flange 314A, and second vent flange 314B when radiator assembly 200 is in the stowed configuration. In various embodiments, the seal formed by fan gasket 404 may be configured to ensure that at least 85%, at least 90%, at least 95%, or at least 99% of the air flowing through first radiator 408A and second radiator 408B enters fan assembly 302. Shroud casing 414 further comprises a shroud flange 420 configured to be coupled to a rear service of radiator frame assembly 406. First return line inlet aperture 416A may be configured to receive a first coolant return line and second return line inlet aperture 416B may be configured to receive a second coolant return line.

In various embodiments, radiator frame assembly 406 comprises a lower frame bracket 422, an upper frame bracket 424, a first lateral frame bracket 426, and a second lateral frame bracket 428. Upper frame bracket 424 and lower frame bracket 422 may extend in the transverse direction, be substantially parallel with each other, and may be separated from each other in the vertical direction. First lateral frame bracket 426 and second lateral frame bracket 428 may extend in the vertical direction, be substantially parallel with each other, and may be separated from each other in the transverse direction. Stated otherwise, both first lateral frame bracket 426 and second lateral frame bracket 428 may be substantially orthogonal to both upper frame bracket 424 and lower frame bracket 422. Upper frame bracket 424, lower frame bracket 422, first lateral frame bracket 426, and second lateral frame bracket 428 may each be configured to receive one or more fasteners to couple each frame bracket to another frame bracket of radiator frame assembly 406. In various embodiments, an upper portion of first lateral frame bracket 426 is coupled to a first lateral portion of upper frame bracket 424, a lower portion of first lateral frame bracket 426 is coupled to a first lateral portion of lower frame bracket 422, an upper portion of second lateral frame bracket 428 is coupled to a second lateral portion of upper frame bracket 424, and a lower portion of second lateral frame bracket 428 is coupled to a second lateral portion of lower frame bracket 422.

Each frame bracket comprises a radiator recess 430 configured to receive at least a portion of either or both of first radiator 408A and/or second radiator 408B. More specifically, a radiator recess 430 of upper frame bracket 424 (which may be defined by a first vertically extending flange and a second vertically extending flange) is configured to receive a top portion of first radiator 408A and a top portion of second radiator 408B. A radiator recess 430 of lower frame bracket 422 (which may be defined by a first vertically extending flange and a second vertically extending flange) is configured to receive a bottom portion of first radiator 408A and a bottom portion of second radiator 408B. A radiator recess 430 of first lateral frame bracket 426 (which may be defined by a first transversely extending flange and a second transversely extending flange) is configured to receive a first lateral portion of first radiator 408A. A radiator recess 430 of second lateral frame bracket 428 (which may be defined by a first transversely extending flange and a second transversely extending flange) is configured to receive a first lateral portion of second radiator 408B. A second lateral portion of first radiator 408A may be positioned adjacent to a second lateral portion of second radiator 408B. Stated otherwise, first radiator 408A and second radiator 408B may be positioned adjacent to each other in radiator frame assembly 406.

In various embodiments, radiator frame assembly 406 further comprises one or more gaps 432 configured to allow one or more coolant lines to be coupled to first radiator 408A and second radiator 408B. For example, radiator frame assembly 406 may comprise a first gap 432A on the second transversely extending flange of lower frame bracket 422, a second gap 432B positioned near an intersection of first lateral frame bracket 426 and upper frame bracket 424, and a third gap 432C positioned near an intersection of second lateral frame bracket 428 and upper frame bracket 424. A first coolant inlet line aperture 434A of first radiator 408A and a second coolant inlet line aperture 434B of second radiator 408B may extend through first gap 432A and be configured to receive a first coolant inlet line (not shown) and a second coolant inlet line (not shown), which may form a portion of thermal management system 112. A first return line outlet aperture 436A may extend through second gap 432B and be configured to receive first coolant return line (not shown). Finally, a second return line outlet aperture 436B may extend through third gap 432C and be configured to receive second coolant return line (not shown).

With momentary focus on first radiator 408A, heated coolant from some heat generating system (such as power generating system 110) enters first coolant inlet line aperture 434A of first radiator 408A and travels vertically upward through a plurality of parallel-oriented microchannels (not shown) internal to first radiator 408A. The size and positioning of such microchannels may be configured to maximize the amount of heat transfer in first radiator 408A by maximizing the surface area the coolant is exposed to. As the heated coolant travels through the plurality of parallel-oriented microchannels, incoming air from the external environment enters a front surface of first radiator 408A (through grille assembly 106) and heat is transferred from the heated coolant to the air via convective heat transfer, thereby cooling the heated coolant. Fan assembly 302 helps to increase such heat transfer by increasing the rate of airflow through first radiator 408A by pulling the air through first radiator 408A. After traveling through the plurality of parallel-oriented microchannels, the coolant exits the first radiator 408A through the first coolant return line. The first coolant return line enters first return line inlet aperture 416A of shroud casing 414 where it may be coupled directly or indirectly to a rear coolant line (not shown) positioned forward of fan assembly 302 and rearward of first radiator 408A and support frame assembly 410. The rear coolant line enables additional heat transfer from the heat transfer taking place in first radiator 408A and may comprise a serpentine or substantially straight hose having a certain amount of flexibility along its length to permit the hose to expand and contract as radiator assembly 200 is deployed and stowed, respectively. The coolant (now cooled) then exits the radiator assembly 200 through a first coolant outlet line (not shown) extending through first coolant outlet aperture 322A to return the coolant to thermal management system 112 and the heat generating system or component (for example, power generating system 110) to provide cooling. Second radiator 408B and its related components may be configured and operate in a similar manner as discussed above.

Returning to radiator assembly 200 more broadly, as discussed above, rotating assembly 400 further comprises first actuation bracket 412A and second actuation bracket 412B. First actuation bracket 412A is rotatably coupled to first fixed actuation bracket 356A of stationary assembly 300 via a first actuation pin 440A. Similarly, second actuation bracket 412B is rotatably coupled to second fixed actuation bracket 356B of stationary assembly 300 via a second actuation pin 440B. First fixed actuation bracket 356A and second fixed actuation bracket 356B are each configured to be coupled directly or indirectly to a portion of chassis 104 (for example, a chassis crossmember) via a first fixed actuation bracket mount and a second fixed actuation bracket mount, respectively. In various embodiments, first actuation bracket 412A and second actuation bracket 412B are configured to be coupled to a lower surface of lower frame bracket 422. To achieve third service configuration SC3, first actuation bracket 412A rotates about first actuation pin 440A relative to first fixed actuation bracket 356A and second actuation bracket 412B rotates about second actuation pin 440B relative to second fixed actuation bracket 356B.

As discussed above, rotating assembly 400 further comprises support frame assembly 410. Support frame assembly 410 is configured to provide structural support for radiator assembly 200 (more specifically, first radiator 408A, second radiator 408B, and radiator frame assembly 406) and provide a structure for limiting movement of radiator assembly when radiator assembly 200 is in a stowed position (for example, operable configuration OC). Support frame assembly 410, which forms a portion of rotating assembly 400, is further configured to interact with stationary assembly 300 to allow rotating assembly 400 to be deployed or stowed as required by the various operable and/or service configurations.

In various embodiments, support frame assembly 410 comprises a first vertically oriented support bar 442A and a second vertically oriented support bar 442B spaced apart in the transverse direction from first vertically oriented support bar 442A. First vertically oriented support bar 442A may be positioned rearward of first radiator 408A and second vertically oriented support bar 442B may be positioned rearward of second radiator 408B. In various embodiments, first vertically oriented support bar 442A is coupled to lower frame bracket 422 via a first attachment tab 444A and coupled to upper frame bracket 424 via a second attachment tab 446A. Similarly, second vertically oriented support bar 442B is coupled to lower frame bracket 422 via a first attachment tab 444B and coupled to upper frame bracket 424 via a second attachment tab 446B. The various attachment tabs may be coupled to lower frame bracket 422 and upper frame bracket 424 using any suitable attachment method, including welding, fasteners, or the like. In various embodiments, each of first vertically oriented support bar 442A and second vertically oriented support bar 442B comprise a longitudinal bow 448A, 448B at a location adjacent to upper frame bracket 424. Stated otherwise, each of first vertically oriented support bar 442A and second vertically oriented support bar 442B may extend longitudinally rearward from its respective first attachment tab 444A to its respective longitudinal bow 448A, 448B and extend longitudinally forward from its respective longitudinal bow 448A, 448B to its respective second attachment tab 446. Such structures permit the first vertically oriented support bar 442A and second vertically oriented support bar 442B to deflect to dissipate stresses caused by rotating assembly 400 impacting the stationary assembly 300 when radiator assembly 200 is returned to the stowed position. Moreover, each of first vertically oriented support bar 442A and second vertically oriented support bar 442B comprise a transverse bow 450A, 450B positioned vertically below the respective longitudinal bows 448A, 448B when radiator assembly 200 is in the stowed configuration.

Support frame assembly 410 further comprises a transverse support bar 458. Transverse support bar 458 may extend in the transverse direction and be substantially orthogonal to first vertically oriented support bar 442A and second vertically oriented support bar 442B when viewed orthogonally to the X-Y plane. Transverse support bar 458 comprises a first attachment tab 460A and a second attachment tab 460B. First attachment tab 460A may be coupled to first lateral frame bracket 426 and second attachment tab 460B may be coupled to second lateral frame bracket 428. First attachment tab 460A and second attachment tab 460B may be coupled to first lateral frame bracket 426 and second lateral frame bracket 428, respectively, using any suitable attachment method, including welding, fasteners, or the like. In various embodiments, transverse support bar 458 is positioned at least partially rearward of first vertically oriented support bar 442A and second vertically oriented support bar 442B.

In various embodiments, transverse support bar 458 comprises a first bow 462A, a second bow 462B, and a third bow 462C. More specifically, transverse support bar 458 may extend longitudinally rearward from first attachment tab 460A and second attachment tab 460B to first bow 462A and third bow 462C, respectively. Transverse support bar 458 may extend longitudinally forward from first bow 462A and third bow 462C to second bow 462B. Stated otherwise, first bow 462A and third bow 462C may be positioned longitudinally rearward of second bow 462B, which may be positioned substantially even with first attachment tab 460A and second attachment tab 460B in the longitudinal direction.

Support frame assembly 410 further comprises a first striker mount 464A, a fourth pulley mount 466, and a second striker mount 464B in various embodiments. First striker mount 464A may be integral with or coupled to transverse support bar 458 and positioned on first bow 462A at a location rearward of first vertically oriented support bar 442A. First striker mount 464A comprises a first striker 468A configured to interface with first latch 504A (which forms a portion of actuation assembly 500) coupled to first latch mount 352A of stationary assembly 300. Similarly, second striker mount 464B may be integral with or coupled to transverse support bar 458 and positioned on third bow 462C at a location rearward of second vertically oriented support bar 442B. Second striker mount 464B comprises a second striker 468B configured to interface with a second latch 504B (which forms a portion of actuation assembly 500) coupled to second latch mount 352B of stationary assembly 300. Fourth pulley mount 466 may be integral with or coupled to transverse support bar 458 and positioned on second bow 462B at a transverse midpoint of transverse support bar 458. Fourth pulley mount 466 is configured to mount a fourth pulley 502D (which forms a portion of actuation assembly 500) to transverse support bar 458 and permit the fourth pulley 502D to rotate about a vertical axis extending through a centerline of fourth pulley 502D.

Moving on and with continued reference to FIGS. 2A, 2B, 2C, 3A, 3B, 4A, and 4B, as discussed above, radiator assembly 200 further comprises actuation assembly 500, which may be configured to provide the actuation force required to deploy the radiator assembly 200 as required by third service configuration SC3 and the actuation force required to stow radiator assembly as required by operable configuration OC, for example. In some exemplary embodiments, actuation assembly 500 (and actuation assembly 600 discussed below) may be configured to enable and limit rotation of rotating assembly 400 relative to stationary assembly 300. In various embodiments, actuation assembly 500 comprises a winch 508, winch cable 506, a pull cable 510, first pulley 502A, second pulley 502B, third pulley 502C, fourth pulley 502D, first latch 504A, and second latch 504B. While described herein as comprising winch and pulley system, actuation assembly 500 is not limited in this regard and may comprise any other suitable actuation mechanism to rotate rotating assembly 400 relative to stationary assembly 300, for example, a motor and spindle mechanism or other mechanism. In various embodiments, winch 508 may be spaced apart from the remaining portions of radiator assembly 200 (via winch mount 340) in the transverse direction but may overlap one or more components of radiator assembly 200 (such as fan assembly 302) in the longitudinal direction. More specifically, in various embodiments, the winch 508 may be longitudinally forward of fan assembly 302, longitudinally rearward of radiator frame assembly 406, and longitudinally aligned with at least a portion of fan frame assembly 324. Positioning the winch 508 (or other actuation mechanism) in this manner may enable the radiator assembly 200 to be deployed or stowed without winch 508 (or other actuation mechanism) occupying volume rearward of radiator assembly 200. As a result, this unoccupied volume can instead be used to contain other vehicles systems and components, such as those associated with thermal management system 112.

In various embodiments, pull cable 510 comprises a pull cable handle 512, a pull cable mount 514, a first cable 516A, a cable split 518, a second cable 516B, and a third cable 516C. Pull cable 510 is mounted to winch mount 340 via pull cable mount 514, which may be configured to receive one or more fasteners or the like. Pull cable handle 512 may be configured to be inserted into or removed from a pull cable handle aperture formed in pull cable mount 514. First cable 516A is coupled to pull cable handle 512 on a first end and coupled to cable split 518 on a second end. Second cable 516B is coupled to cable split 518 on a first end and coupled to first latch 504A on a second end. Similarly, third cable 516C is coupled to cable split 518 on a first end and coupled to second latch 504B on a second end. In various embodiments, second cable 516B and third cable 516C extend through a cable aperture formed through frame plate 326.

When radiator assembly 200 is in the stowed position, first striker 468A and second striker 468B are enclosed in and constrained by first latch 504A and second latch 504B, respectively. First latch 504A and second latch 504B may each comprise one or more springs that bias the first latch 504A and the second latch 504B in a closed position. In response to a user or service technician pulling the pull cable handle 512, first cable 516A, second cable 516B, and third cable 516C become tensioned and apply force to first latch 504A and second latch 504B, respectively, thereby opening the first latch 504A and second latch 504B. As a result, first striker 468A and second striker 468B can be released from first latch 504A and second latch 504B, respectively, thereby enabling the rotating assembly 400 to rotate relative to stationary assembly 300. When radiator assembly 200 is returned to the stowed position from the deployed position, first striker 468A and second striker 468B contact the first latch 504A and second latch 504B, respectively, which are configured to receive and constrain the first latch 504A and second latch 504B. The springs included in first latch 504A and second latch 504B ensure the respective latches close around first striker 468A and second striker 468B to prevent radiator assembly 200 from inadvertently returning to the deployed position.

In various embodiments, winch 508, which is coupled to winch mount 340, may comprise a winch housing 520, which may contain an electric motor (not shown), a winch drum (not shown), and a gear train (not shown). In various embodiments, in response to a control signal, the electric motor rotates the winch drum in either direction. Winch cable 506, which may be coupled to and wrap circumferentially around the winch drum, is configured to be reeled in or reeled out depending on the direction of rotation of the winch drum. The gear train, which may comprise a reduction gear, may be configured to increase the torque output by the electric motor. While discussed herein as comprising an electric motor, winch 508 is not limited in this regard and may additionally or alternatively comprise a manual crank (not shown) that may be directly coupled to the winch drum through winch housing 520 to enable a user to manually reel the winch cable 506 in and out.

Winch cable 506 extends through winch housing 520 and is in contact with first pulley 502A, second pulley 502B, third pulley 502C, and fourth pulley 502D. In various embodiments, winch cable 506 wraps circumferentially around at least a portion of fourth pulley 502D and an end of winch cable 506 is fixed to winch cable terminal 354 to assist in maintaining tension on winch cable 506 and to anchor the winch cable 506 to stationary assembly 300. First pulley 502A, second pulley 502B, third pulley 502C, and fourth pulley 502D may be configured to rotate about their respective axes as winch cable 506 is reeled in and out in order to limit friction forces acting on winch cable 506. In response to a control signal or manual input, the winch drum rotates in a first direction causing winch 508 to reel the winch cable 506 out, thereby allowing rotating assembly 400 to rotate (in a first direction) about second axis of rotation A2 relative to stationary assembly 300. When deployed in third service configuration SC3, rotating assembly 400 may be positioned at a second angle $\alpha 2$ relative to stationary assembly 300. In various embodiments, second angle $\alpha 2$ may be between approximately 70° and 110°, between approximately 80° and 100°, or approximately 90°. The range of motion of rotating assembly 400 may be limited by the length of winch cable 506.

To transition the radiator assembly 200 from the deployed configuration to the stowed configuration (as required by operable configuration OC, first service configuration SC1, and second service configuration SC2), the process can be reversed. For example, in response to a control signal or manual input, the winch drum rotates in a second direction opposite the first direction causing winch 508 to reel the winch cable 506 in. As winch cable 506 is reeled in, rotating assembly 400 rotates in a second direction and is pulled toward stationary assembly 300 until first striker 468A and second striker 468B contact the first latch 504A and second latch 504B, respectively.

Figure 5:
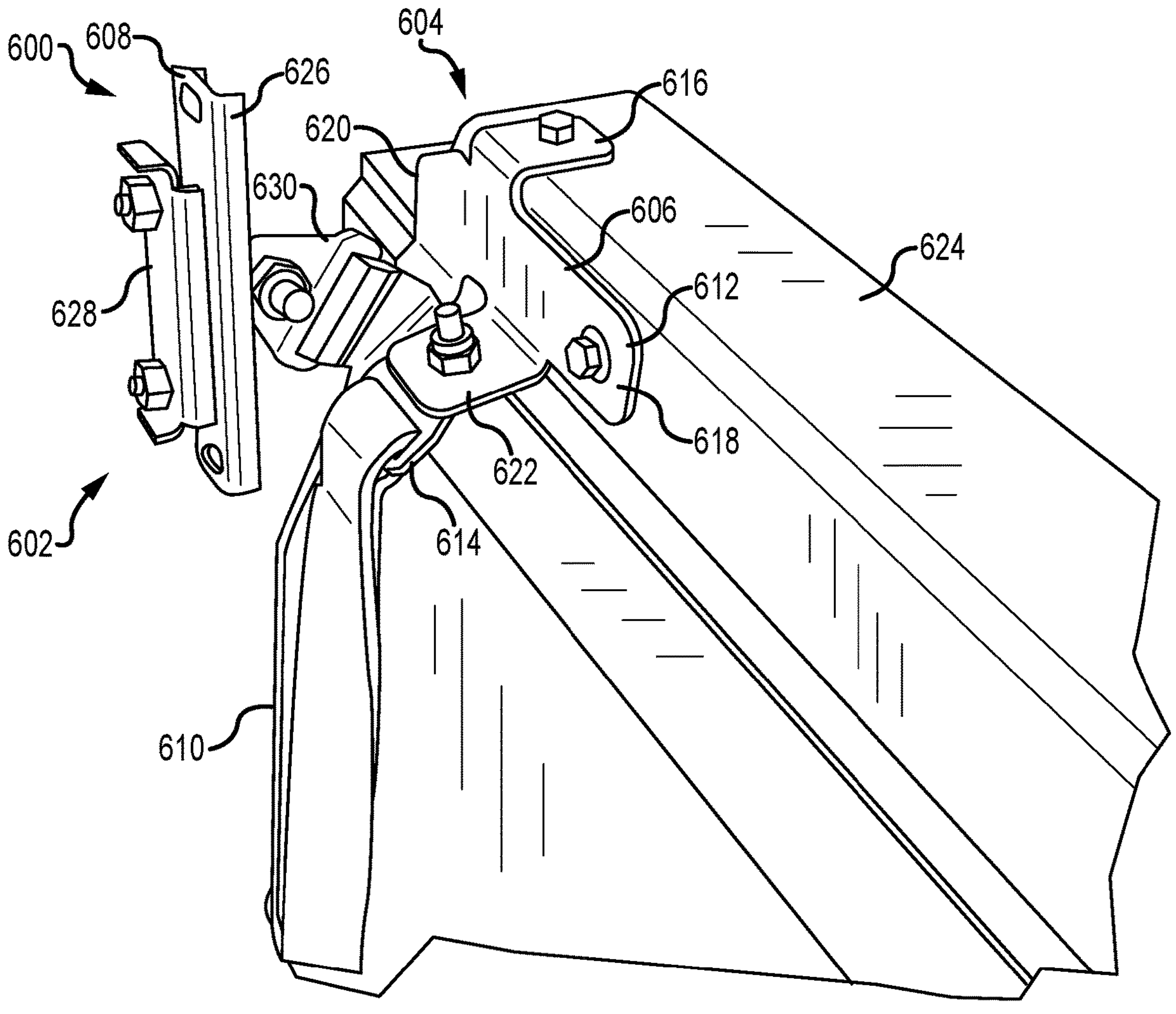
FIG. 5 illustrates a top perspective view of a radiator assembly, in accordance with various embodiments.

With additional reference to FIG. 5, a portion of radiator assembly 200 is illustrated comprising an alternative actuation assembly 600, in accordance with various embodiments. Radiator assembly 200 may be substantially similar to the radiator assembly described above in relation to FIGS. 2A, 2B, 2C, 3A, 3B, 4A, and 4B, however, one or more components of actuation assembly 500 may be replaced by the components of actuation assembly 600. More specifically, winch 508, winch cable 506, first pulley 502A, second pulley 502B, third pulley 502C, and fourth pulley 502D may be removed from radiator assembly 200 and replaced by actuation assembly 600. In various embodiments, pull cable 510, first latch 504A, and second latch 504B may be retained. Actuation assembly 600 is intended to offer a manual solution for switching between second service configuration SC2 and third service configuration SC3, which may have the benefit of reducing part count, system complexity, and cost.

In various embodiments, actuation assembly 600 comprises a strap assembly 602 and an actuation handle 604. As illustrated in FIG. 5, actuation handle 604 comprises a looped strap handle coupled to an outboard surface of second lateral frame bracket 428, however, actuation handle 604 may comprise any structure (for example, a knob, pull, handle, lever, or the like) coupled to any portion of radiator assembly 200 and configured to allow a user to impart sufficient torque to rotate rotating assembly 400 relative to stationary assembly 300. More specifically, actuation handle 604 may be coupled to any other structure accessible from the front of radiator assembly 200, including upper frame bracket 424 or first lateral frame bracket 426.

Strap assembly 602 comprises a first strap anchor assembly 606, a second strap anchor assembly 608, and a strap 610 in various embodiments. Strap 610 may comprise a flexible or semiflexible material with sufficient tensile strength to support all or a portion of the weight of rotating assembly 400. In various embodiments, strap 610 comprises a nylon, polyester, polypropylene, polyethylene, aramid (e.g., Kevlar, Nomex, or the like), or other suitable material. First strap anchor assembly 606 comprises an anchor 612 and a first anchor plate 614. First anchor plate 614 may be coupled to a first end of strap 610 and rotatably coupled to anchor 612 (about a vertically or substantially (+/−10%) vertically oriented axis) via one or more fasteners or the like. Anchor 612 comprises a first tab 616, a second tab 618, a third tab 620, and a fourth tab 622. In various embodiments, first tab 616, second tab 618, third tab 620, and fourth tab 622 provide mounting locations for mounting the anchor 612 to radiator frame assembly 406, or in the case of fourth tab 622, to first anchor plate 614. More specifically, in various embodiments, first tab 616 is coupled to an upper surface of upper frame bracket 424, second tab 618 and third tab 620 are coupled to a rear surface of upper frame bracket 424, and fourth tab 622 is coupled to first anchor plate 614. First tab 616 may be substantially (+/−10%) normal to second tab 618 and third tab 620. Fourth tab 622 may be angled downward (i.e., in a direction toward fan shroud 402) with respect to the rear surface of upper frame bracket 424 and the remaining portions of anchor 612 to provide clearance between fourth tab 622 and upper frame bracket 624.

Second strap anchor assembly 608 comprises a first clamp plate 626, a second clamp plate 628, and a second anchor plate 630. Second anchor plate 630 is coupled to a second end of strap 610 and rotatably coupled (about a horizontally or substantially (+/−10%) horizontally oriented axis) to first clamp plate 626. First clamp plate 626 and second clamp plate 628 may be coupled together using one or more fasteners or the like. First clamp plate 626 may be configured to be coupled to a front surface of cab 102 (for example, a firewall or dash panel), while second clamp plate 628 may be configured to be coupled to a rear surface of the same. When rotating assembly 400 is deployed, strap 610 becomes tensioned and imparts tensile forces on second anchor plate 630, first clamp plate 626, and second clamp plate 628. Second clamp plate 628, which is in contact with the rear surface of cab 102, experiences compression forces against the rear surface of cab 102. This arrangement advantageously distributes forces caused by the weight of rotating assembly 400 across a larger surface area (for example, across the entire surface of the cab firewall).

Similar to actuation assembly 500 discussed above, a user desiring to transition the vehicle 100 from second service configuration SC2 to third service configuration SC3 may actuate the pull cable handle 512, thereby causing first latch 504A and second latch 504B to open, releasing the rotating assembly 400 from stationary assembly 300. The user may then pull the actuation handle 604 causing rotating assembly 400 to rotate about second axis of rotation A2. When deployed in third service configuration SC3 (using actuation assembly 600 rather than actuation assembly 500), second angle $\alpha 2$ may be between approximately 10° and 90°, between approximately 20° and 60°, or approximately 40°. The range of motion of rotating assembly 400 may be limited by the length and/or the elasticity of strap 610. In some exemplary embodiments, radiator assembly 200 may comprise one or more mechanical stops (for example, integrated with first and second fixed actuation brackets 356A/356B) to support the weight of rotating assembly 400, which may allow strap assembly 602 to be decoupled from rotating assembly 400 and/or cab 102 (for example, by removing the one or more fasteners or the like that may couple the anchor 612 to first anchor plate 614 or second anchor plate 630 to first clamp plate 626).

Actuation assembly 600 may permit routine inspection and repairs of radiator assembly 200 without the need to fully rotate rotating assembly 400 relative to stationary assembly 300. Further, actuation assembly 600 may allow cab 102 to be rotated as necessary to achieve fourth service configuration SC4 without contacting the radiator assembly 200. More extensive inspections and repairs may be enabled through the rotation of cab 102 to achieve fourth service configuration SC4. Stated otherwise, the rotation of rotating assembly 400 (enabled and limited by actuation assembly 600) may result in a first amount of angular displacement of rotating assembly 400 (equivalent to second angle $\alpha 2$) and the rotation of cab 102 may result in a second amount of angular displacement of rotating assembly 400. The first amount of angular displacement may be less than the second amount of angular displacement, greater than the second amount of angular displacement, or substantially (+/−10%) equal to the second amount of angular displacement. In various embodiments, a third amount of angular displacement, which may be the sum of the first amount of angular displacement and the second amount of angular displacement, may be between approximately 70° and 110°, between approximately 80° and 100°, or approximately 90°.

In some exemplary embodiments, radiator assembly 200 may comprise an actuation assembly structure that differs from both actuation assembly 500 and actuation assembly 600 described above. In some embodiments, the actuation assembly may take the form of a spring-loaded torsion bar or helical torsion spring that may be coupled to the fixed actuation brackets (for example, first fixed actuation bracket 356A and second fixed actuation bracket 356B) and actuation brackets (for example, first actuation bracket 412A and second actuation bracket 412B), for example, in place of the actuation pins (for example, first actuation pin 440A and second actuation pin 440B). The spring-loaded torsion bar or helical torsion spring may be configured to resist twisting as rotating assembly 400 rotates relative to stationary assembly 300 by exerting a torque in the opposite direction. Such a design may allow a user to exploit gravitational forces for controlled rotation of the rotating assembly in the first direction D1 and reduce the amount of force required to rotate rotating assembly 400 in the second direction D2 to return the rotating assembly 400 to the stowed configuration. In other embodiments, the actuation assembly may comprise other manually or electrically (motor) driven mechanical mechanisms coupled to a drive rod coupled to the actuation brackets and/or fixed actuation brackets. For example, in some embodiments, the actuation assembly may comprise a hand crank or electric motor coupled to a gear assembly (compound gear, bevel gear, worm gear), belt and pulley assembly, chain and sprocket assembly, coupling assembly, ratchet assembly, or a combination thereof coupled to the drive rod and configured to enable and/or limit rotation of rotating assembly 400 relative to stationary assembly 300. Numerous embodiments of the actuation assembly are contemplated in this regard.

The structures and function of radiator assembly 200 outlined above result in an efficient and compact solution that allows users and service technicians to gain access to critical components of vehicle 100. More specifically, by configuring the radiator assembly 200 such that a substantial portion of radiator assembly 200 remains stationary (for example, the components rearward of fan gasket 404) as radiator assembly 200 is deployed, the size and weight of the components associated with actuation assembly 500 are minimized because less weight associated with the rotating assembly is required to be supported during deployment. Additionally, by positioning the actuation mechanism (in the case of actuation assembly 500) transversely relative to the remaining portions of radiator assembly 200, or otherwise discreetly (in the case of actuation assembly 600), volume rearward of radiator assembly 200 is conserved for other crucial vehicles systems and components. As stated above, this may be particularly beneficial in the case of electric vehicles due to the large number of parts that are required to be packaged.

In various embodiments, one or more steps described herein may be manually implemented or may be implemented by a controller. For example, in various embodiments, first service configuration SC1 and second service configuration SC2 may be accomplished by the user or service technician manually actuating the grille assembly 106 and manually removing access panel 124, respectively. As stated above, in various embodiments, the user or service technician may also transition the vehicle 100 into third service configuration SC3 by manually cranking the winch 508 to deploy the radiator assembly 200. Alternatively, the user or service technician may cause radiator assembly 200 to be deployed by sending one or more CAN signals to an onboard controller (such as a body control module (BCM) or front control module (FCM)) through an infotainment interface or through a handheld controller. In turn, the onboard controller may send another signal to radiator assembly 200 to cause rotating assembly 400 to rotate relative to stationary assembly 300. The latter process may be similar for fourth service configuration SC4. In various embodiments, the user or service technician may be required to send a discrete signal for each step (for example, a first signal to deploy the radiator assembly 200 and a second signal to deploy the cab 102). However, in various embodiments, in response to receiving a single signal from the user or service technician, the onboard controller may send multiple signals to deploy the radiator assembly 200 and cab 102 in a sequenced manner, for example, radiator assembly 200 first, followed by cab 102. In such a way, improper sequencing (and resulting damage to radiator assembly 200) caused by operator error may be eliminated.

In various embodiments, one or more position sensors may be coupled to vehicle 100 and/or radiator assembly 200 to monitor the position of rotating assembly 400 during deployment and/or stowage. More specifically, one or more contact or contactless position sensors may be coupled to chassis 104, any portion of cab 102, any component positioned between cab 102 and chassis 104, and/or to radiator assembly 200. The position sensor(s) may comprise a resistance-based sensor, capacitive sensor, optical position sensor, fiberoptic position sensor, a combination of the above, or other suitable sensor type. In various embodiments, the position sensor may be configured to monitor the position of rotating assembly 400 relative to stationary assembly 300 and transmit one or more signals indicating radiator assembly 200 has been partially deployed, fully deployed, partially stowed, or fully stowed. Such signal(s) may be transmitted to the vehicle operator or service technician through the vehicle's human-machine interface (HMI) and/or to one or more onboard controllers. In various embodiments, at least one signal may correlate to a position of radiator assembly 200 that would permit the cab 102 to be tilted in either direction without physically interfering with radiator assembly 200 plus a safety factor, for example. In various embodiments, such a signal may be a prerequisite for allowing cab 102 to rotate in either direction as required to transition the vehicle 100 from operable configuration OC to fourth service configuration SC4 or vice versa. Stated otherwise, cab 102 of vehicle 100 may be prevented from rotating until the position sensor signals that cab 102 may be rotated without physically interfering with radiator assembly 200. Similar position sensors may be implemented to ensure that radiator assembly 200 does not physically interfere with grille assembly 106 and/or access panel 124 in various embodiments.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" or "at least one of A, B, and C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

Methods, systems, and articles are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radiator assembly, comprising:

a stationary assembly comprising a fan assembly coupled to a fan frame assembly;

a rotating assembly comprising a radiator frame assembly and a support frame assembly coupled to the radiator frame assembly; and an actuation assembly coupled to the rotating assembly, wherein the fan frame assembly comprises a frame plate, a frame bracket, a first attachment bracket, and a second attachment bracket, wherein the stationary assembly further comprises a latch mount coupled to the frame bracket, wherein the rotating assembly is rotatably coupled to the stationary assembly and configured to rotate relative to the stationary assembly in a first direction and a second direction opposite the first direction, and wherein the actuation assembly is configured to enable and limit rotation of the rotating assembly relative to the stationary assembly in the first direction and the second direction.

2. The radiator assembly of claim 1, wherein the rotating assembly further comprises a striker coupled to a striker mount coupled to the support frame assembly.

3. The radiator assembly of claim 2, wherein the actuation assembly comprises a latch coupled to the latch mount and configured to interface with the striker.

4. The radiator assembly of claim 3, wherein the actuation assembly comprises a pull cable coupled to and configured to open the latch.

5. The radiator assembly of claim 1, wherein the actuation assembly comprises a torsion bar or a helical torsion spring coupled to a pair of fixed actuation brackets.

6. The radiator assembly of claim 1, wherein the actuation assembly comprises an electric motor coupled to a gear assembly.

7. A radiator assembly, comprising:

a stationary assembly comprising a fan assembly coupled to a fan frame assembly;

a rotating assembly comprising a radiator frame assembly and a support frame assembly coupled to the radiator frame assembly; and an actuation assembly coupled to the rotating assembly, wherein the actuation assembly comprises a strap assembly and an actuation handle, wherein the rotating assembly is rotatably coupled to the stationary assembly and configured to rotate relative to the stationary assembly in a first direction and a second direction opposite the first direction, and wherein the actuation assembly is configured to enable and limit rotation of the rotating assembly relative to the stationary assembly in the first direction and the second direction.

8. The radiator assembly of claim 7, wherein the strap assembly comprises a first strap anchor assembly coupled to the rotating assembly and a second strap anchor assembly configured to be coupled to a vehicle cab.

9. The radiator assembly of claim 8, wherein the strap assembly further comprises a strap rotatably coupled to the first strap anchor assembly and rotatably coupled to the second strap anchor assembly.

10. The radiator assembly of claim 7, wherein the actuation assembly comprises a hand crank.

11. A radiator assembly for an electric vehicle, comprising:

a stationary assembly;

a rotating assembly rotatably coupled to the stationary assembly and configured to rotate in a first direction and a second direction opposite the first direction relative to the stationary assembly; and an actuation assembly coupled to the rotating assembly and configured to enable and limit rotation of the rotating assembly relative to the stationary assembly, wherein the actuation assembly enables a first amount of angular displacement of the rotating assembly, and wherein a cab of the electric vehicle enables a second amount of angular displacement of the rotating assembly.

12. The radiator assembly of claim 11, wherein the stationary assembly comprises a fan assembly and a fan frame assembly coupled to the fan assembly.

13. The radiator assembly of claim 12, wherein the rotating assembly comprises a radiator frame assembly and a support frame assembly coupled to the radiator frame assembly.

14. The radiator assembly of claim 13, wherein the actuation assembly comprises a strap assembly coupled to the radiator frame assembly and the cab.

15. The radiator assembly of claim 14, wherein the strap assembly comprises a first strap anchor assembly coupled to the radiator frame assembly and a second strap anchor assembly coupled to the cab.

16. The radiator assembly of claim 11, wherein the cab of the electric vehicle enables the second amount of angular displacement of the rotating assembly through rotation of the cab.

17. The radiator assembly of claim 11, wherein the radiator assembly is configured to dissipate heat from at least one fuel cell module.

18. The radiator assembly of claim 17, wherein the radiator assembly is further configured to dissipate heat from at least one of a braking system of the electric vehicle, a high voltage battery system of the electric vehicle, or a drive axle of the electric vehicle.

19. The radiator assembly of claim 11, wherein the first amount of angular displacement and the second amount of angular displacement sum to between 70 degrees and 110 degrees, or between 80 degrees and 100 degrees, or 90 degrees.

20. The radiator assembly of claim 11, wherein the radiator assembly is configured to assume a plurality of service configurations, and wherein each service configuration is associated with a specific amount of angular displacement of the rotating assembly.

* * * * *